(12) United States Patent
Xu et al.

(10) Patent No.: US 12,386,928 B2
(45) Date of Patent: Aug. 12, 2025

(54) USER AUTHENTICATION TECHNIQUES

(71) Applicant: Citrix Systems, Inc., Fort Lauderdale, FL (US)

(72) Inventors: Sai Xu, Nanjing (CN); Taodong Lu, Nanjing (CN); Qin Zhang, Nanjing (CN)

(*) Notice: Subject to any disclaimer, the term of this patent is extended or adjusted under 35 U.S.C. 154(b) by 731 days.

(21) Appl. No.: 17/525,049

(22) Filed: Nov. 12, 2021

(65) Prior Publication Data

US 2023/0139695 A1    May 4, 2023

Related U.S. Application Data

(63) Continuation of application No. PCT/CN2021/127214, filed on Oct. 29, 2021.

(51) Int. Cl.
  *G06F 21/31* (2013.01)
(52) U.S. Cl.
  CPC ............................. *G06F 21/31* (2013.01)
(58) Field of Classification Search
  CPC ......................................................... G06F 21/31
  See application file for complete search history.

(56) References Cited

U.S. PATENT DOCUMENTS

| | | | | |
|---|---|---|---|---|
| 6,094,721 A | * | 7/2000 | Eldridge | G06F 21/31 |
| | | | | 713/168 |
| 6,370,649 B1 | * | 4/2002 | Angelo | G06F 21/31 |
| | | | | 235/382 |
| 6,636,973 B1 | * | 10/2003 | Novoa | G06F 21/32 |
| | | | | 340/5.82 |
| 6,993,666 B1 | * | 1/2006 | Hokkanen | G06F 21/34 |
| | | | | 726/5 |
| 7,788,497 B2 | * | 8/2010 | Luo | G06F 21/6227 |
| | | | | 726/4 |
| 9,639,692 B1 | * | 5/2017 | Xue | H04W 12/126 |

(Continued)

FOREIGN PATENT DOCUMENTS

| CN | 111079125 A | 4/2020 |
|---|---|---|
| CN | 112651040 A | 4/2021 |

OTHER PUBLICATIONS

International Search Report (ISR) and Written Opinion (WO) of the International Searching Authority in PCT Application PCT/CN2021/127214, English Translation.

(Continued)

*Primary Examiner* — James R Turchen

(57) ABSTRACT

One disclosed method involves receiving a first plurality of character keycodes corresponding to authenticate a first user to a first application, determining, based at least in part on the first user operating the client device, a first conversion process applicable to the first user, converting, using the first conversion process, the first plurality of character keycodes into a second plurality of character keycodes different than the first plurality, and providing the second plurality of character keycodes to authenticate the first user to the first application, wherein the first application is configured to authenticate using the second plurality of character keycodes instead of the first plurality, thus, prohibiting a second user from using the first plurality of character keycodes to authenticate to the first application absent application of the first conversion process.

18 Claims, 22 Drawing Sheets

(56) References Cited

U.S. PATENT DOCUMENTS

| | | | | |
|---|---|---|---|---|
| 2006/0083228 A1* | 4/2006 | Ong | ............... | H04L 63/0823 |
| | | | | 370/389 |
| 2010/0082966 A1* | 4/2010 | Lu | ............... | G06F 21/575 |
| | | | | 713/2 |
| 2014/0164768 A1* | 6/2014 | Kruglick | ............... | H04L 63/062 |
| | | | | 713/168 |
| 2014/0313007 A1* | 10/2014 | Harding | ............... | G07C 9/37 |
| | | | | 340/5.52 |
| 2014/0380440 A1* | 12/2014 | Nakagawa | ............... | H04L 63/08 |
| | | | | 726/6 |
| 2021/0028923 A1* | 1/2021 | Ryou | ............... | H04L 9/14 |
| 2022/0271917 A1* | 8/2022 | Krishna | ............... | H04L 9/0841 |

OTHER PUBLICATIONS

MatrixMind. "(non-official translation: Analysis of Android Runtime Permission Processing)" https:/lblog.csdn.net/MatrixMindlarticle/details/87892272, Feb. 23, 2019 (Feb. 23, 2019).

\* cited by examiner

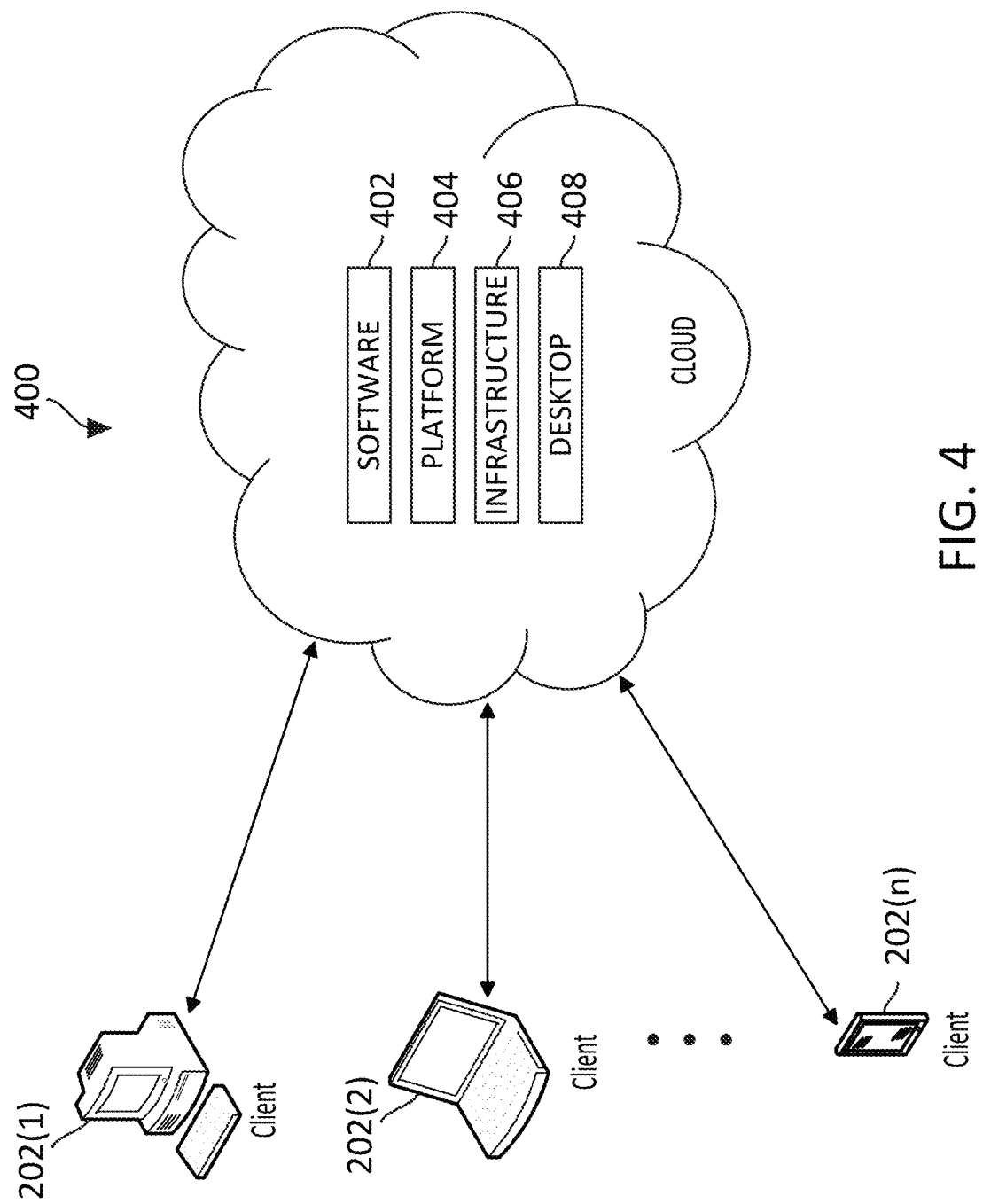

USER AUTHENTICATION TECHNIQUES

CROSS-REFERENCE TO RELATED APPLICATIONS

This application is a continuation of and claims the benefit under 35 U.S.C. § 120 and 35 U.S.C. § 365(c) to International Application PCT/CN2021/127214, entitled USER AUTHENTICATION TECHNIQUES, with an international filing date of Oct. 29, 2021, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, FL, such as the Citrix Workspace™ family of products and The Virtual Apps and Desktop™ family of products provide such capabilitspecies.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method may involve a first computing system receiving a first plurality of character keycodes corresponding to characters input via a client device to authenticate a first user to a first application, determining, based at least in part on the first user operating the client device, a first conversion process applicable to the first user, converting, using the first conversion process, the first plurality of character keycodes into a second plurality of character keycodes different than the first plurality, and providing the second plurality of character keycodes to authenticate the first user to the first application, wherein the first application is configured to authenticate the first user using the second plurality of character keycodes instead of the first plurality of character keycodes, thus prohibiting a second user from using the first plurality of character keycodes to authenticate to the first application absent application of the first conversion process.

In some disclosed embodiments, a system may comprise at least a first computing system comprising at least one processor at least one computer-readable medium encoded with instructions which, when executed by the at least one processor, cause the first computing system to receive a first plurality of character keycodes corresponding to characters input via a client device to authenticate a first user to a first application, determine, based at least in part on the first user operating the client device, a first conversion process applicable to the first user, convert, using the first conversion process, the first plurality of character keycodes into a second plurality of character keycodes different than the first plurality, and provide the second plurality of character keycodes to authenticate the first user to the first application, wherein the first application is configured to authenticate the first user using the second plurality of character keycodes instead of the first plurality of character keycodes, thus prohibiting a second user from using the first plurality of character keycodes to authenticate to the first application absent application of the first conversion process.

In some disclose embodiments, at least one non-transitory computer-readable medium may be encoded with instructions which, when executed by at least one processor of a computing system, cause the computing system to receive a first plurality of character keycodes corresponding to characters input via a client device to authenticate a first user to a first application, determine, based at least in part on the first user operating the client device, a first conversion process applicable to the first user, convert, using the first conversion process, the first plurality of character keycodes into a second plurality of character keycodes different than the first plurality, and provide the second plurality of character keycodes to authenticate the first user to the first application, wherein the first application is configured to authenticate the first user using the second plurality of character keycodes instead of the first plurality of character keycodes, thus prohibiting a second user from using the first plurality of character keycodes to authenticate to the first application absent application of the first conversion process.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 4 is a schematic block diagram of a cloud computing environment in which various aspects of the disclosure may be implemented;

DETAILED DESCRIPTION

Figure 1:
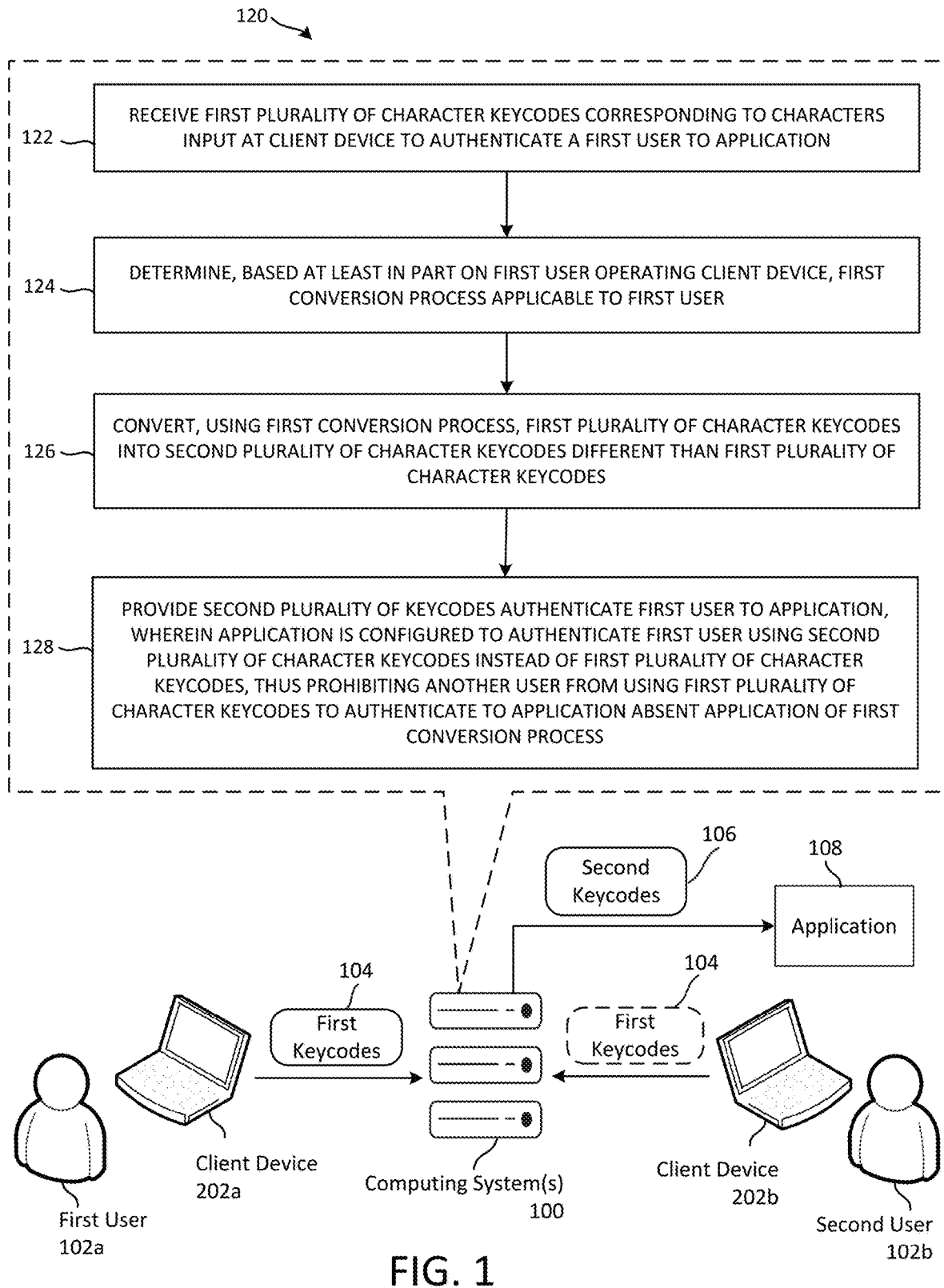
FIG. 1 shows an example implementation of a user authentication system, in accordance with some embodiments of the present disclosure.

Many applications and other resources (e.g., websites, databases, etc.) require user authentication to identify a user requesting access to the resource. User authentication may involve a user providing credentials, such as, a username and a password (or other similar inputs, such as, a pin, a passcode, etc.), using which the resource may authenticate the user, and grant the user access to the resource if authentication is successful. The inventors have recognized and appreciated that a user may (intentionally or unintentionally) share the credentials with another user, who may attempt to access the resource as the user.

Offered are techniques for authenticating a user, using a converted version of user credentials, to grant access to an application. Some implementations involve determining a conversion process associated with the user, converting an entered input/password to another input using the conversion process, and sending the converted input to an application to authenticate the identity of the user. The conversion process may be specific to the user, and may be determined/selected based on identifying the user operating the client device. The application is configured to authenticate the user using the converted input instead of the input/password provided by the user. Using the conversion process specific to the user prohibits another user from using the same credentials to access the application. In some implementations, the conversion process may be associated with the client device operated by the user to prevent the second user from accessing the application using the first user's credentials with use of a second device.

Using the techniques described herein, a user inputting another user's credentials may not be authenticated to gain access to the application, as the conversion process used to convert the credentials is particularly associated with the user. For example, a first user may input a username and a password to access a first application, a computing system may determine a first conversion process associated with the first user and may determine a first converted password using the first conversion process and the password inputted by the first user. The computing system may send the first converted password, along with the username, to the first application to authenticate the identity of the first user. A second user may input the same username and password as the first user to access the first application, the computing system may determine a second conversion process (different than the first conversion process) associated with the second user and based on the identity of the second user, and may determine a second converted password using the second conversion process and the password inputted by the second user. The second converted password is different than the first converted password since different conversion processes are used in determining the converted passwords. The computing system may send the second converted password, along with the username, to the first application for authentication. In this case, authentication fails, since the second converted password does not match the converted password for the first user, and the second user may not be able to access the first application using the first user's credentials.

The conversion process for converting user credentials may be unique for individual users, and in some implementations may also be unique for different applications. In some implementations, the user may have access to the conversion process based on being authenticated at the client device or the computing system. In some implementations, the conversion process may be executed at the client device, while in other implementations, the conversion process may be executed at a remote computing system. The remote computing system, in some implementations, may be configured to allow users to access applications and other resources using remote access.

In some implementations, a user may use a remote access technique to access applications and other resources. Such remote access techniques may be enabled, for example, by a multi-resource access system 500 (described below in relation to FIGS. 5A-5C in Section E) or by a resource delivery system 600 (described below in relation to FIG. 6A in Section F). The user may access one or more applications and other resources using a resource access application 522 (described in Section E) or a resource access application 624 (described in Section F). In such implementations, the user may first provide user credentials to authenticate the identity of the user for the resource access application 522/624, then provide user credentials to access an application. The conversion process used to convert the user credentials may be determined based on the user being authenticated for the resource access application 522/624. For example, the conversion process may be associated with a user identifier for the user for the resource access application 522/624.

For purposes of reading the description below of the various embodiments, the following descriptions of the sections of the specification and their respective contents may be helpful:

Section A provides an introduction to example embodiments of a user authentication system;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F describes an example implementation of a resource delivery system which may be useful for practicing embodiments described herein;

Section G describes an example architecture of a resource virtualization server;

Section H provides a more detailed description of example embodiments of the user authentication system introduced in Section A; and Section I describes example implementations of methods, systems/devices, and computer-readable media in accordance with the present disclosure.

A. Introduction to Illustrative Embodiments of a User Authentication System

FIG. 1 shows an example configuration with which some aspects of the present disclosure may be implemented. As shown, one or more computing systems 100 may be in communication with one or more client devices 202 operated by respective users 102, and may also be in communication with an application 108. The computing system(s) 100 may include one or more servers 204, or may be embodied in whole or in part by one or more of the client devices 202, e.g., the client device 202a. Examples of components that may be used to implement the client device 202 and the servers 204, as well as examples of computing environments in which such components may be deployed, are described below in connection with FIGS. 2-4 (in Sections B-D).

In some implementations, the application 108 may be a remotely hosted application, such as a SaaS application 508 described below in connection with FIGS. 5A-5B (in Section E). In such implementations, the computing system(s) 100 may include one or more components of, and/or operate in conjunction with, the multi-resource access system 500 shown in FIGS. 5A-5C and described below in Section E.

In other implementations, the application 108 may be running on one or more shared computing resources 602 described below in connection with FIGS. 6A-6E (in Section F). In such implementations, the computing system(s) 100 may include one or more components of, and/or operate in conjunction with, the resource delivery system 600 shown in FIGS. 6A-6E and described below in Section F.

The example shown in FIG. 1 involves a first user 102a operating a client device 202a and wanting to access the application 108 at the client device 202a. To do so, the first user 102a may provide an input, at the client device 202a, representing user credentials for authenticating identity of the first user 102a to the application 108.

In some implementations, the computing system(s) 100 may perform a process 120 shown in FIG. 1. At a step 122, the computing system(s) 100 may receive a first plurality of character keycodes 104 corresponding to characters inputted at the client device 202a to authenticate the first user 102a to the application 108. The first user 102a may provide the input using a keyboard (physical or virtual) of the client device 202a, a mouse of the client device 202a, a touchscreen of the client device 202a, or using other peripherals of the client device 202a. The first user 102a may provide the input in the form of character keycodes corresponding to characters shown on a typical keyboard, or corresponding to some custom characters that may be made available via a customized keyboard or via a display screen of the client device 202a. In some implementations, the first user 102a may provide the input in the form of a voice input that may be captured by a microphone of the client device 202a, and the client device 202a may determine the character keycodes from the voice input (e.g., using one or more speech-to-text processing techniques). The client device 202a may send the keycode(s) 104 to the computing system 100.

At a step 124 of the process 120, the computing system(s) 100 may determine, based at least in part on the first user 102a operating the client device 202a, a first conversion process applicable to the first user 102a. The computing system(s) 100 may determine that the first user 102a is operating the client device 202a. This determination may depend on the particular implementation of the computing system(s) 100 and the client device 202a.

In some implementations, the first user 102a may authenticate identity to the client device 202a prior to attempting to access the application 108. Such authentication may be the first user 102a logging into the client device 202a. Based on this successful authentication, the computing system(s) 100 may determine that the first user 102a is operating the client device 202a.

In the implementations where the application 108 is a SaaS application 508 accessed via the multi-resource access system 500 shown in FIGS. 5A-5B, the first user 102a may, as described below in detail in Section E, authenticate the user's identity to resource management services 502 by providing an input(s) at the client device 202a representing user credentials for a resource access application 522. The computing system(s) 100 may determine that the first user 102a is operating the client device 202a based on successful authentication for the resource access application 522.

In the implementations where the application is provided by the shared computing resources 602 of the resource delivery system 600 shown in FIGS. 6A-6E, the first user 102a may, as described below in detail in Section F, authenticate the user's identity to the resource delivery system 600 by providing an input(s) at the client device 202a representing user credentials for a resource access application 624. The computing system(s) 100 may determine that the first user 102a is operating the client device 202a based on successful authentication for the resource access application 624.

In some implementations, the computing system(s) 100 may determine the first user 102a is operating the client device 202a using multi-factor authentication techniques. Multi-factor authentication techniques may involve granting access to a resource (e.g., the computing system(s) 100, the application 108, a client device 202, etc.) only after a user successfully presents two or more pieces of evidence (or factors) to an authentication mechanism. Such authentication mechanism may involve presenting evidence of one or more of: knowledge (something only the user knows), possession (something only the user has), and/or inherence (something only the user is). Based on the first user 102a successfully authenticating the user's identity via a multi-factor authentication technique, the computing system(s) 100 may determine that the first user 102a is operating the client device 202a.

Based on determining that the first user 102a is operating the client device 202a, the computing system(s) 100 may determine the first conversion process applicable to the first user 102a. As used herein, a conversion process may involve applying an encoding technique to convert a set of inputted character keycodes to a set of different character keycodes.

The conversion process, in some implementations, may additionally or alternatively involve applying a cryptography technique, such as, using salt (random data) with the set of inputted character keycodes to determine the set of different character keycodes.

In some implementations, the computing system(s) 100 may store data representing the first conversion process to be used for the first user 102a. For example, in the implementations where the application 108 is a SaaS application 508, the data representing the first conversion process may be stored at a single sign-on service 520 (or by some other component of the resource management services 502) shown in FIG. 5B and described below in Section E. As another example, in the implementations where the application 108 is provided by a shared computing resource 602, the data representing the first conversion process may be stored at a resource delivery controller(s) 612 shown in FIGS. 6A-6E and described below in Section F. In other implementations, the data representing the first conversion process may be stored at the client device 202a, and the computing system(s) 100 may receive the data representing the first conversion process in response to the computing system(s) 100 determining that the first user 102a is operating the client device 202a (in the step 124 of the process 120).

At a step 126 of the process 120, the computing system 100 may convert, using the first conversion process, the first plurality of character keycodes 104 into a second plurality of character keycodes 106 different than the first plurality of character keycodes 104. As described above, the first conversion process may involve using an encoding technique and/or use of random data (e.g., salt) with the first plurality of character keycodes 104. Salt, as used herein, refers to a cryptography technique where salt/random data is used as an additional input to an encoding function, for example, a one-way function that hashes data representing a user credential (e.g., a password, a pin, a pin code, a passphrase, etc.).

At a step 128 of the process 120, the computing system(s) 100 may provide the second plurality of keycodes 106 to authenticate the first user 102a to the application 108, wherein the application 108 is configured to authenticate the first user 102a using the second plurality of character keycodes 106 instead of the first plurality of character keycodes 104, thus prohibiting another user (e.g., second user 102b) from using the first plurality of keycodes 104 to authenticate to the application 108 absent application of the first conversion process. As described above in relation to the steps 124 and 126, the first conversion process is specific or otherwise unique to the first user 102a and is determined based on the identity of the first user 102a. As such, the second plurality of keycodes 106 are specific to the first user 102a. Moreover, the application 108 is configured to accept the second plurality of keycodes 106 as the credentials for the first user 102a, instead of the first plurality of keycodes 104 (which may be the desired/inputted credentials by the first user 102a).

Since the first conversion process is specific to the first user 102a, the second user 102b, operating a client device 202b, cannot use the first plurality of keycodes 104 to access the application 108 as the first user 102a. To illustrate this point, here is a brief description of the processing that may occur at the computing system(s) 100 with respect to the second user 102b providing the first keycodes 104. The second user 102b, via the client device 202b, may provide an input(s) corresponding to the first plurality of keycodes 104, and the computing system(s) 100 may receive the first plurality of keycodes 104 (in a similar manner as described above in relation to the step 122 of the process 120). The computing system(s) 100 may determine that the second user 102b is operating the client device 202b in a similar manner as described above in relation to the step 124 of the process 120. For example, the second user 102b may authenticate the second user's identity to the resource access application 522/624, or may authenticate the user's identity using a multi-factor authentication technique, or may authenticate the user's identity by logging into the client device 202b. Based on this authentication, the computing system(s) 100 may determine that the second user 102b is operating the client device 202b from which the first plurality of keycodes 104 is received. Based on determining that the second user 102b is operating the client device 202b, the computing system(s) 100 may determine a second conversion process associated with the second user 102b in a similar manner as described above in relation to the step 126 of the process 120. The second conversion process may be specific or otherwise unique to the second user 102b, and may be based on data representing the second conversion process (where the data representing the second conversion process may be stored at the single sign-on service 520, the resource delivery controller(s) 612, or the client device 202b). The data representing the second conversion process may be made available/accessible based on the computing system(s) 100 determining that the second user 102b is operating the client device 202b. The second conversion process is different than the first conversion process associated with the first user 102a, since the second conversion process is specific or otherwise unique to the second user 102b whereas the first conversion process is specific or otherwise unique to the first user 102a. Moreover, the second user 102b does not have access to the first conversion process, since the authenticated identity of the second user 102b is different than the authenticated identity of the first user 102a, and the second conversion process is made accessible to the second user 102b based on determining that the second user 102b is operating the client device 202b in a similar manner as described above in relation to step 124 of the process 120. Using the second conversion process, the computing system(s) 100 may convert the first plurality of keycodes 104 to a third plurality of character keycodes that is different than the first and second plurality of keycodes 104, 106. The third plurality of character keycodes is different than the second plurality of keycodes 106 because of the second conversion process being different than the first conversion process. The computing system(s) 100 may send the third plurality of keycodes to the application 108, and authentication at the application 108 will fail, since the application 108 is configured to accept the second plurality of keycodes 106 to authenticate the first user 102a. In other words, the second user 102b may attempt to use the credentials (e.g., username and password) of the first user 102a to access the application 108, but because the conversion processes being user specific, the second user 102b will not be able to access the application 108 as the first user 102a and using the first user's 102a credentials.

In this manner, the computing system(s) 100 may use a conversion process specific to a first user to prevent another/second user from using the first user's credentials to access an application.

Additional details and example implementations of embodiments of the present disclosure are set forth below in Section H, following a description of example systems and network environments in which such embodiments may be deployed.

B. Network Environment

Figure 2:
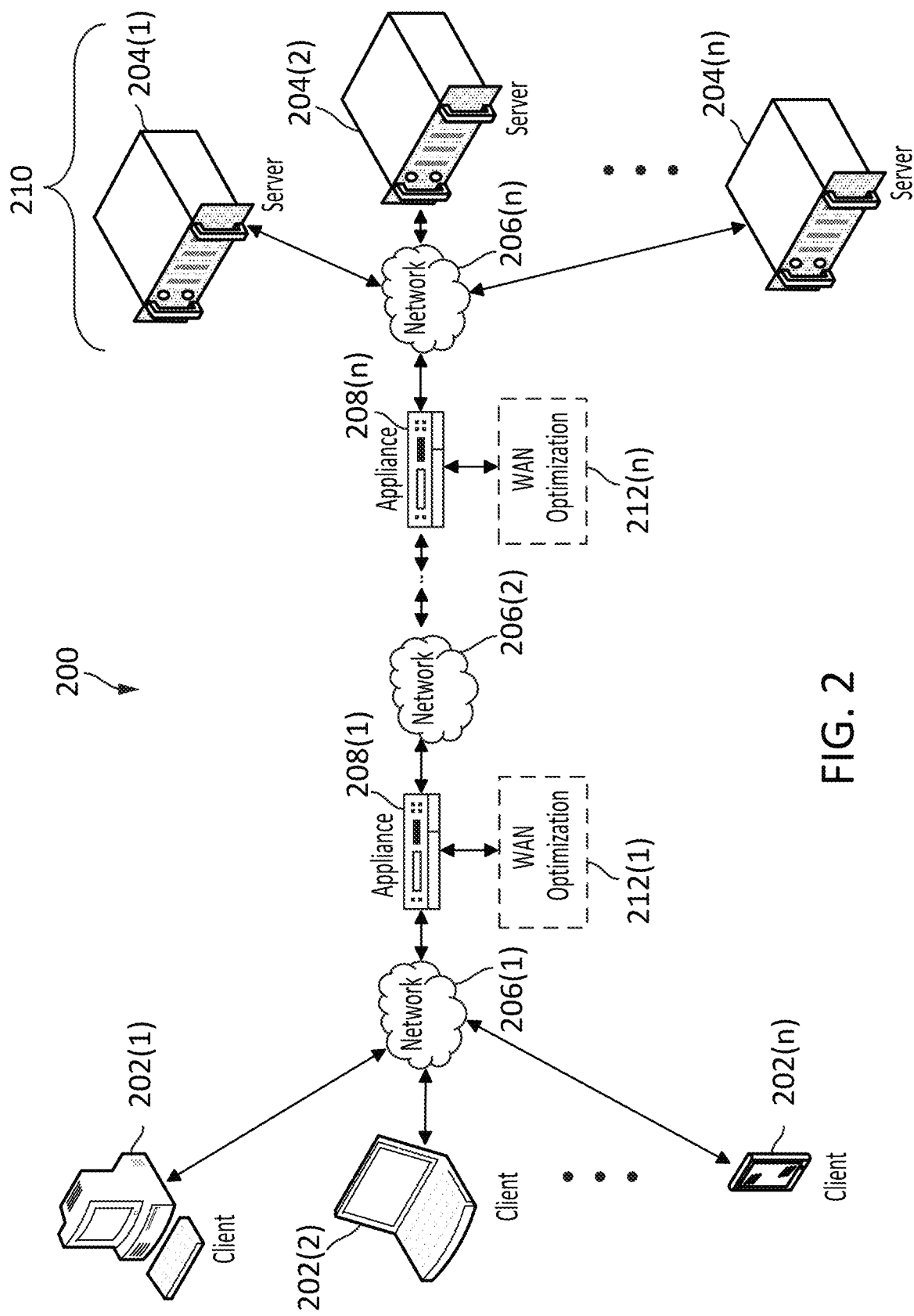
FIG. 2 is a diagram of a network environment in which some embodiments of the user authentication system disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network (s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
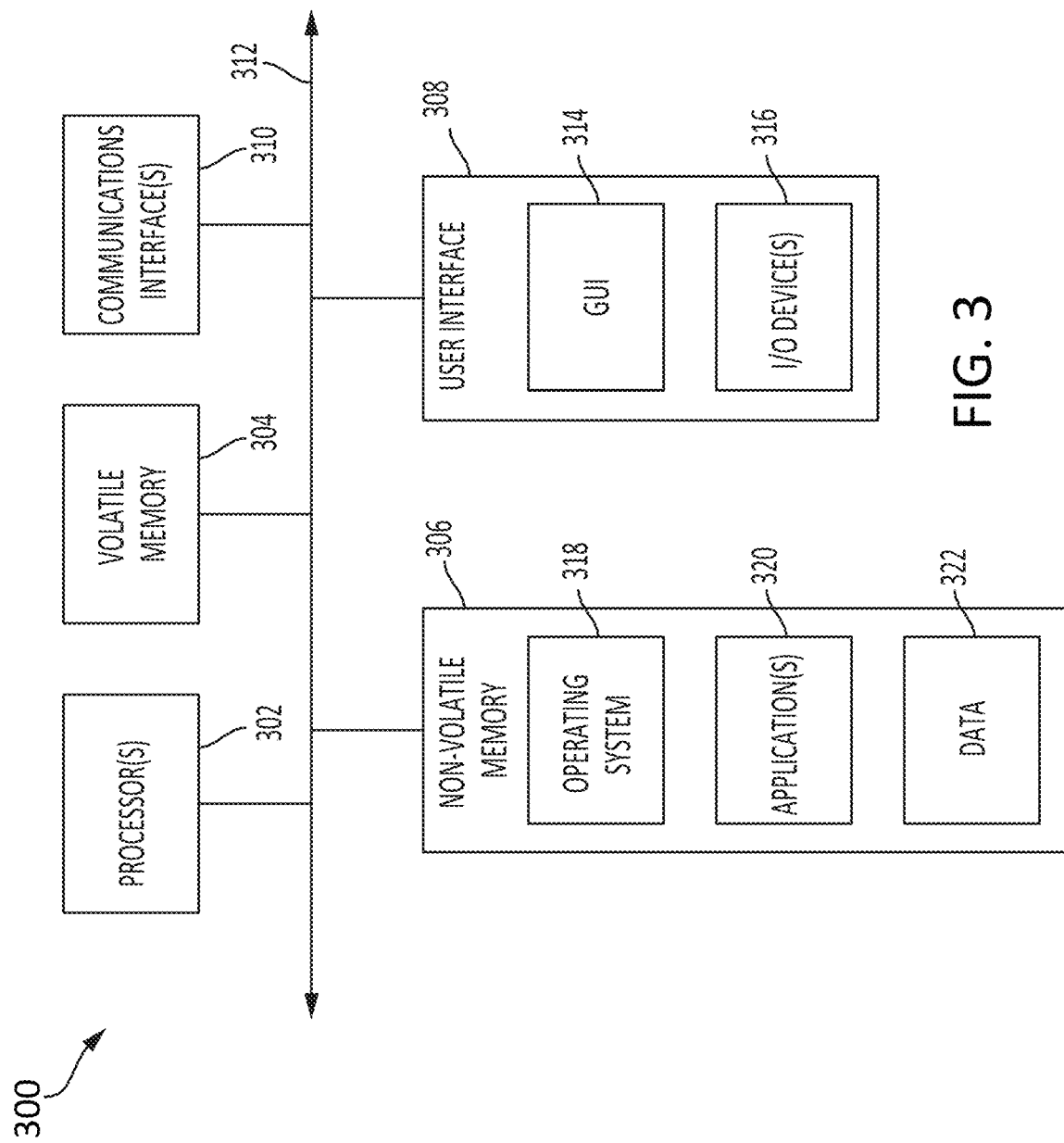
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5A:
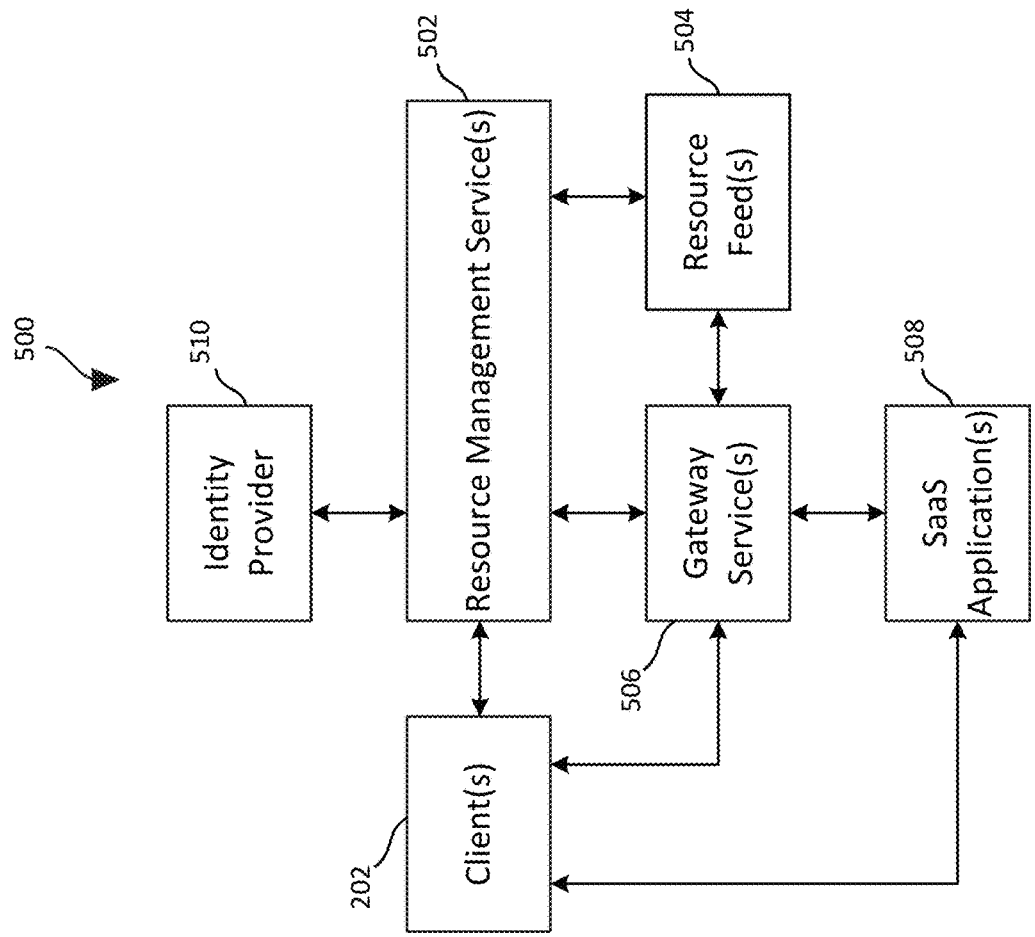
FIG. 5A is a block diagram of an example system in which resource management services may manage and streamline access by clients to resource feeds (via one or more gateway services) and/or software-as-a-service (SaaS) applications.
Figure 5B:
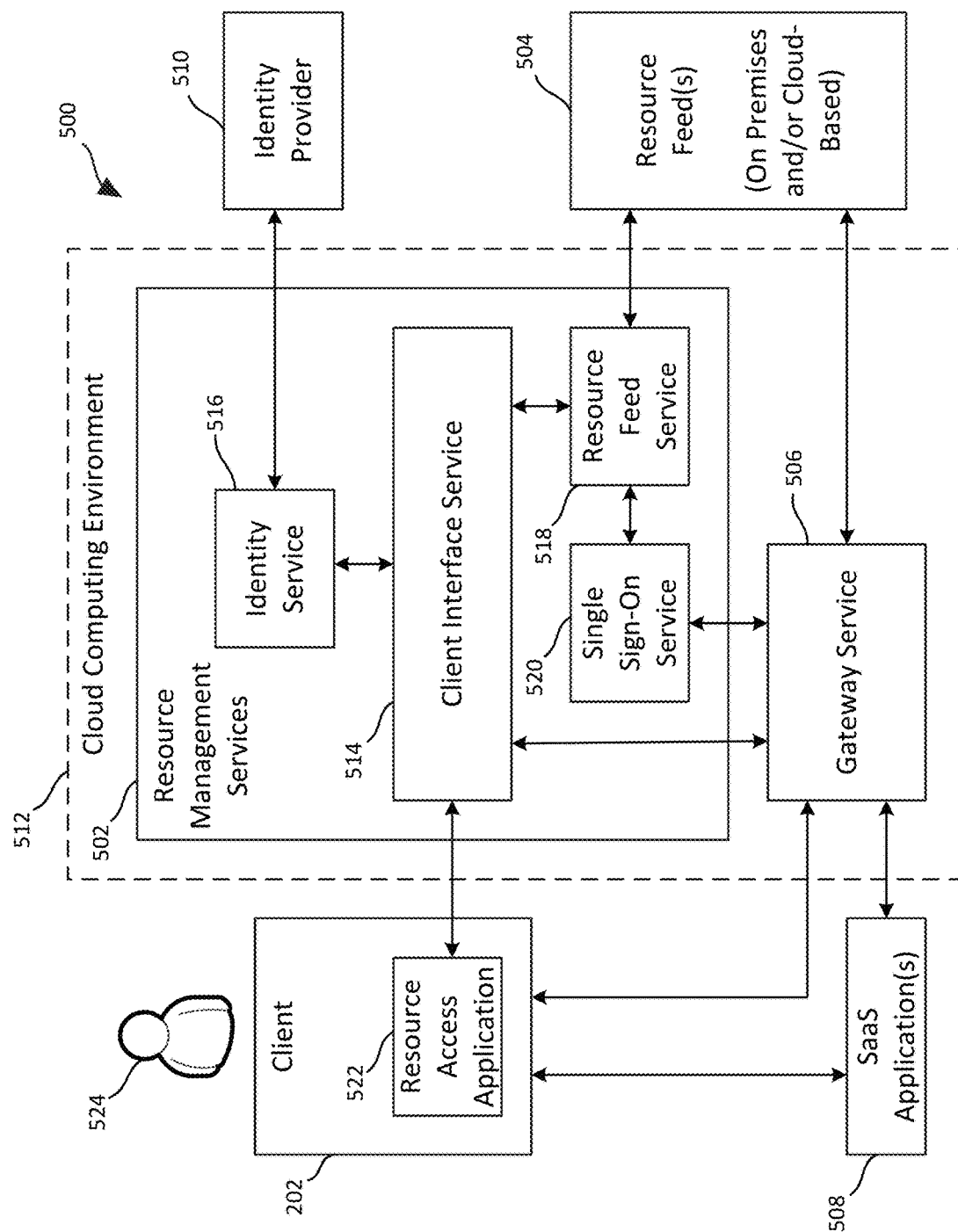
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
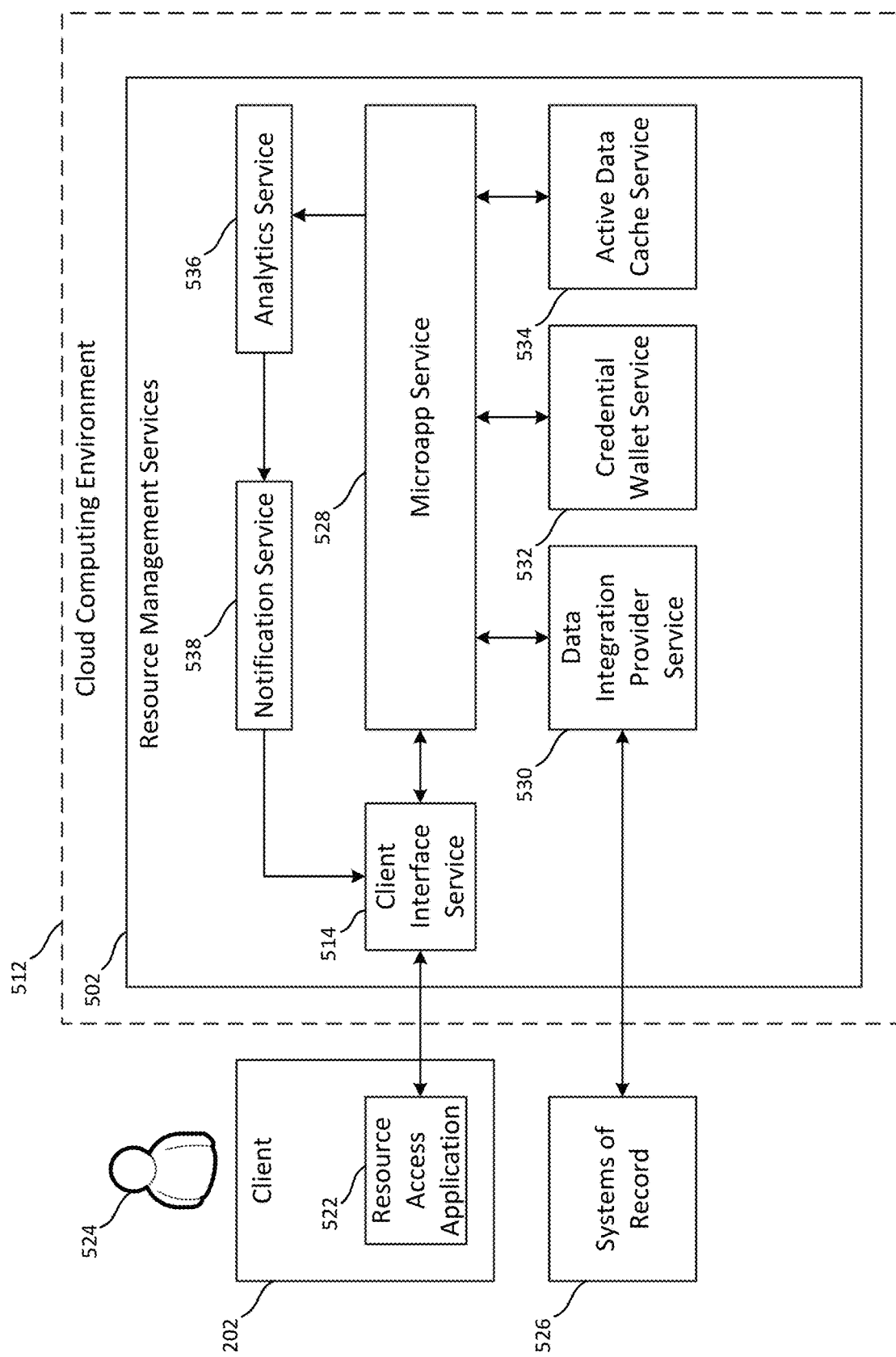
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapps service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream or otherwise provide the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
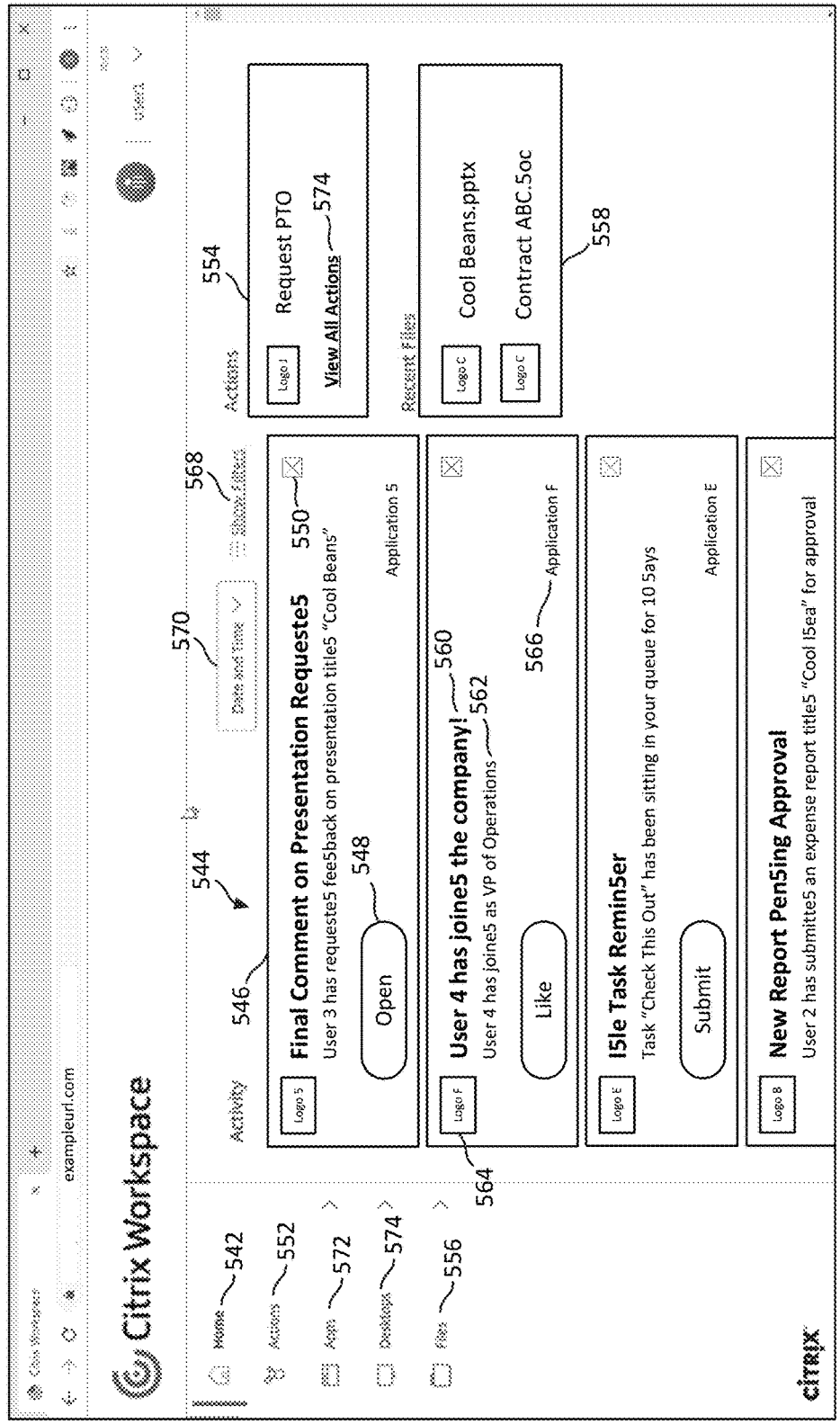
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp.

In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of available microapp actions. In some implementations, the various microapp actions available to the user 524 logged onto the multi-resource access system 500 may be enumerated to the resource access application 522, e.g., when the user 524 initially accesses the system 500, and the list 554 may include a subset of those available microapp actions. The available microapp actions may, for example, be organized alphabetically based on the names assigned to the actions, and the list 554 may simply include the first several (e.g., the first four) microapp actions in the alphabetical order. In other implementations, the list 554 may alternatively include a subset of the available microapp actions that were most recently or most commonly accessed by the user 524, or that are preassigned by a system administrator or based on some other criteria. The user 524 may also access a complete set of available microapp actions, in a similar manner as the "action" user interface element 552, by clicking on the "view all actions" user interface element 574.

As shown, additional resources may also be accessed through the screen 540 by clicking on or otherwise selecting one or more other user interface elements that may be presented on the screen. For example, in some embodiments, the user may also access files (e.g., via a Citrix ShareFile® platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

Figure 6A:
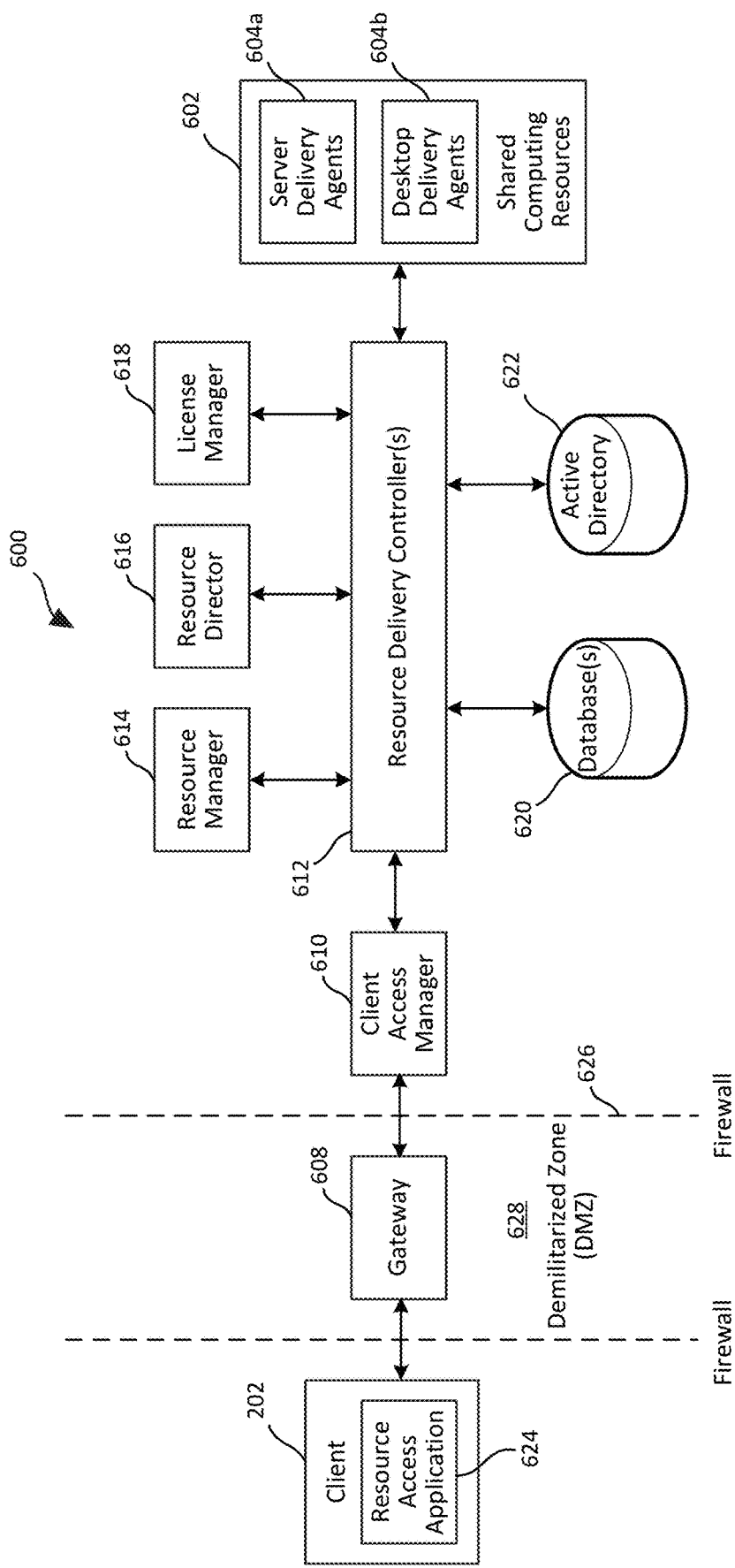
FIG. 6A is a block diagram illustrating key components of a resource delivery system which may be useful for practicing embodiments described herein.

F. Systems and Methods for Delivering Virtualized Applications and/or Desktops to Client Devices FIG. 6A is a block diagram illustrating key components of a resource delivery system 600 that may enable a client device 202 to remotely access one or more virtual applications or desktops running on one or more shared computing resources 602. The shared computing resources 602 may include physical machines and/or virtual (e.g., hypervisor driven) machines, and may be located at a data center, within a cloud computing environment, or elsewhere. As described in more detail below, such shared computing resources 602 may implement one or more resource delivery agents 604, including one or more server delivery agents 604a and/or one or more desktop delivery agents 604b. The Virtual Delivery Agents (VDAs) of the Citrix Virtual Apps and Desktops™ system offered by Citrix Systems, Inc., of Fort Lauderdale, Florida, are example implementations of the resource delivery agents 604. In some implementations, the resource delivery system 600 may give an information technology (IT) department of an organization control of virtual machines, applications, licensing, and security while providing "anywhere access" for any device. As described below, the resource delivery system 600 may enable end users to run applications and/or desktops independently of the operating system and interface of the end user's device. Further, the resource delivery system 600 may enable administrators to manage the network and control access from selected devices or from all devices, as well as to manage an entire network from a single data center.

The resource delivery system 600 shown in FIG. 6A may, for example, correspond to an implementation of a Citrix Virtual Apps and Desktops™ system offered by Citrix Systems, Inc., of Fort Lauderdale, Florida. Such systems employ a unified architecture called FlexCast Management Architecture (FMA). Among other things, FMA provides the ability to run multiple versions of Citrix Virtual Apps or Citrix Virtual Desktops™ as well as integrated provisioning.

As shown in FIG. 6A, in addition to the shared computing resources 602, the resource delivery system 600 may include a gateway 608, a client access manager 610, one or more resource delivery controllers 612, a resource manager 614, a resource director 616, a license manager 618, one or more databases 620, and an Active Directory (AD) 622 or other directory service.

The resource delivery controller(s) 612 may be the central management component of the resource delivery system 600. In some implementations, the resource delivery controller(s) 612 may be installed on at least one server in a data center of an organization. The Delivery Controller of the Citrix Virtual Apps and Desktops™ system offered by Citrix Systems, Inc., of Fort Lauderdale, Florida, is one example implementation of the resource delivery controller(s) 612. For reliability and availability, respective resource delivery controllers 612 may be installed on multiple servers. The resource delivery controller(s) 612 may communicate with the shared computing resources 602 to distribute applications and/or desktops, authenticate and manage user access, broker connections between client devices 202 and resource delivery agents 604 running on respective shared computing resources 602, optimize use connections, and/or load-balance use connections. As described in more detail below, a broker service 632 (shown in FIGS. 6B-6D) of the resource delivery controller(s) 612 may interact with the database(s) 620 to track which users are logged on and where, what session resources the users have, and if users need to reconnect to existing applications. In some implementations, the broker service 632 may execute PowerShell commands and communicate with broker agents 656 (shown in FIG. 6D) of the resource delivery agents 604 over transmission control protocol (TCP) port "80." A monitor service 660 (shown in FIG. 6D) may also be provided by the resource delivery controller(s) 612 to collect historical data concerning the operation of the resource delivery controller(s) 612 and write such data to the database(s) 620. In some implementations, such a monitor service 660 may use TCP port "80" or "443."

The resource delivery controller(s) 612 may manage the state of desktops, starting and stopping them based on demand and administrative configuration. In some implementations, the resource delivery controller(s) 612 may also enable the adjustment of user profiles (stored within the database(s) 620) to manage user personalization settings in virtualized or physical Windows environments.

In some implementations, the database(s) 620 may include at least one Microsoft Structured Query Language (SQL) Server database in which configuration and session information may be stored. As noted above, the database(s) 620 may store the data collected and managed by the services that make up the resource delivery controller(s) 612. In some implementations, the database(s) 620 may be provided within a data center of an organization and may have a persistent connection to the resource delivery controller(s) 612. Although not illustrated in FIG. 6A, it should be appreciated that the resource delivery system 600 may also include respective databases associated with the resource manager 614, the resource director 616, and the license manager 618 to store data collected and/or used by those components.

The resource delivery agents 604 may be installed on physical or virtual machines that are made available to deliver applications or desktops to users. The resource delivery agents 604 may enable such machines to register with the resource delivery controller(s) 612. The registration of a machine with the resource delivery controller(s) 612 may cause that machine and the resources it is hosting to be made available to users. The resource delivery agents 604 may establish and manage the connections between the machines on which they are installed and client devices 202. The resource delivery agents 604 may also verify that a license is available for the user and/or session, and may apply policies that are configured for the session.

The resource delivery agents 604 may communicate session information to the broker service 632 (shown in FIGS. 6B-6D) of the resource delivery controller(s) 612 through the broker agents 656 (shown in FIG. 6D) in the resource delivery agents 604. Such broker agents 656 may host multiple plugins and collect real-time data. In some implementations, the broker agents 656 may communicate with the resource delivery controller(s) 612 over TCP port "80." In some implementations, the resource delivery agents 604 may operate with Single-session and/or Multi-session Windows operating systems. The resource delivery agents 604 for Multi-session Windows operating systems may allow multiple users to connect to the server at one time. The resource delivery agents 604 for Single-session Windows operating systems, on the other hand, may allow only one user to connect to the desktop at a time. In some implementations, one or more the resource delivery agents 604 may alternatively operate with a Linux operating system.

When users connect from outside one or more corporate firewalls, e.g., firewalls 626a and 626b shown in FIG. 6A, the gateway 608 may be used to secure such connections with Transport Layer Security (TLS). The gateway 608 may, for example, be a Secure Socket Layer (SLL) Virtual Private Network (VPN) appliance that is deployed in a demilitarized zone (DMZ) 628. The gateway 608 may thus provide a single secure point of access through the corporate firewall 626.

The client access manager 610 of the resource delivery system 600 may authenticate users and manage stores of desktops and/or applications that are available for users to access. In some implementations, the client access manager 610 may provide an application "storefront" for an enterprise, which may provide users with self-service access to the desktops and/or applications that the enterprise opts to make available to them. In some implementations, the client access manager 610 may also keep track of users' application subscriptions, shortcut names, and other data. Tracking such data may, for example, help ensure that users have a consistent experience across multiple devices.

As shown in FIG. 6A, a resource access application 624 may be installed on client devices 202 or other endpoints (such as virtual desktops). Such resource access applications 624 may provide users with quick, secure, self-service access to documents, applications, and/or desktops. The resource access application 624 may, for example, provide on-demand access to Windows, web, and/or Software as a Service (SaaS) applications. The Citrix Workspace™ app, offered by Citrix Systems, Inc., of Fort Lauderdale, Florida, is one example implementation of such a client-based version of the resource access application 624. In some implementations, the resource access application 624 may alternatively operate on a web server (not shown in FIG. 6A) and may be accessed using a web browser (also not shown in FIG. 6A) installed on the client device 202. In some embodiments, for example, the resource access application 624 may be provided as a hypertext markup language 5 (HTML5) service and may be accessed using an HTML5-compatible web browser. The Citrix Workspace™ app for HTML5, offered by Citrix Systems, Inc., of Fort Lauderdale, Florida, is one example implementation of such a web-based version of the resource access application 624.

In some embodiments, the resource access application 624 may intercept network communications from a network stack used by the one or more applications. For example, the resource access application 624 may intercept a network communication at any point in a network stack and redirect the network communication to a destination desired, managed, and/or controlled by the resource access application 624, for example, to intercept and redirect a transport layer connection to an IP address and port controlled and/or managed by resource access application 624. The resource access application 624 may thus, in some embodiments, transparently intercept any protocol layer below the transport layer, such as the network layer, and any protocol layer above the transport layer, such as the session, presentation, or application layers. The resource access application 624 may, for example, interface with the transport layer to secure, optimize, accelerate, route, and/or load-balance any communications provided via any protocol carried by the transport layer.

In some embodiments, the resource access application 624 may be implemented as an Independent Computing Architecture (ICA) client developed by Citrix Systems, Inc. The resource access application 624 may perform acceleration, streaming, monitoring, and/or other operations. For example, the resource access application 624 may accelerate streaming an application from a shared computing resource 602 running a resource delivery agent 604 to the client device 202. The resource access application 624 may also perform endpoint detection/scanning and/or collect endpoint information about the client 202. For example, the resource access application 624 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The resource manager 614 shown in FIG. 6A, may provide a console from which the configuration and management of applications and desktops that are to be made available to users may be controlled. The Studio component of the Citrix Virtual Apps and Desktops™ system offered by Citrix Systems, Inc., of Fort Lauderdale, Florida, is one example implementation of the resource manager 614. In some implementations, the resource manager 614 may eliminate the need for separate management consoles for managing delivery of applications and desktops. In some embodiments, the resource manager 614 may provide one or more wizards to guide system administrators through environment setup, creating workloads to host applications and desktops, and assigning applications and desktops to users. In some implementations, the resource manager 614 may also be used to allocate and track licenses for the resource delivery system 600. In some embodiments, the resource manager 614 may get the information it displays from the broker service 632 of the resource delivery controller(s) 612, e.g., communicating over TCP port "80."

The resource director 616 may, for example, be a web-based tool that enables IT support and help desk teams to monitor an environment, troubleshoot issues before they become system-critical, and perform support tasks for end users. The Director component of the Citrix Virtual Apps and Desktops™ system offered by Citrix Systems, Inc., of Fort Lauderdale, Florida, is one example implementation of the resource director 616. In some implementations, a single deployment of the resource director 616 may be used to connect to and monitor multiple resource delivery systems 600, such as that shown in FIG. 6A. Examples of information that may be displayed by the resource director 616 include (A) real-time session data from the broker service 632 of the resource delivery controller(s) 612, which may include data the broker service 632 gets from the broker agent 656 in the resource delivery agents 604, and (B) historical data about the resource delivery system 622 that may be received, for example, from the monitor service 660 in the resource delivery controller(s) 612. In some implementations, the resource director 616 may use performance and heuristics data captured by the gateway 608 (described below) to build analytics from the data and then presents such analytics to system administrators. Further, in some implementations, the resource director 616 may allow system administrators to view and interact with a user's sessions, e.g., using Windows Remote Assistance.

The license manager 618, as its name implies, may enable the management of licenses within the resource delivery system 600. In some implementations, the license manager 618 may communicate with the resource delivery controller(s) 612 to manage licensing for a user's session and with the resource manager 614 to allocate license files.

As noted above, in some implementations, the shared computing resources 602 shown in FIG. 6A may include one or more virtual machines. These can be virtual machines that are used to host applications and/or desktops, as well as virtual machines that are used to host the other components of the resource delivery system 600. In some implementations, a hypervisor may be installed on a host computer to run the hypervisor and hosting virtual machines.

Although not depicted in FIG. 6A, in some implementations, the resource delivery system 600 may additionally include a performance monitoring service or agent. In some embodiments, one or more dedicated servers (or a dedicated service in a cloud-based environment) may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., as a part of the resource access application 624), one or more servers 204, or one or more other system component(s). In general, the monitoring agents may execute transparently (e.g., in the background) to any application and/or user of the device. In some embodiments, such a monitoring agent may be implemented as components of Citrix Analytics™ by Citrix Systems, Inc., of Fort Lauderdale, Florida.

The monitoring agents may, for example, monitor, measure, collect, and/or analyze data on a frequency (e.g., a predetermined frequency), based upon an occurrence of given event(s), or in real time during operation of the resource delivery system 600. The monitoring agents may, for example, monitor resource consumption and/or performance of hardware, software, and/or communications resources of the clients 202, the gateway 608 (and/or any other components in the DMZ 628), and/or the resource delivery controller(s) 612, the shared computing resources 602, the resource delivery agents 604, or any other components shown in FIG. 6A. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

Figure 6B:
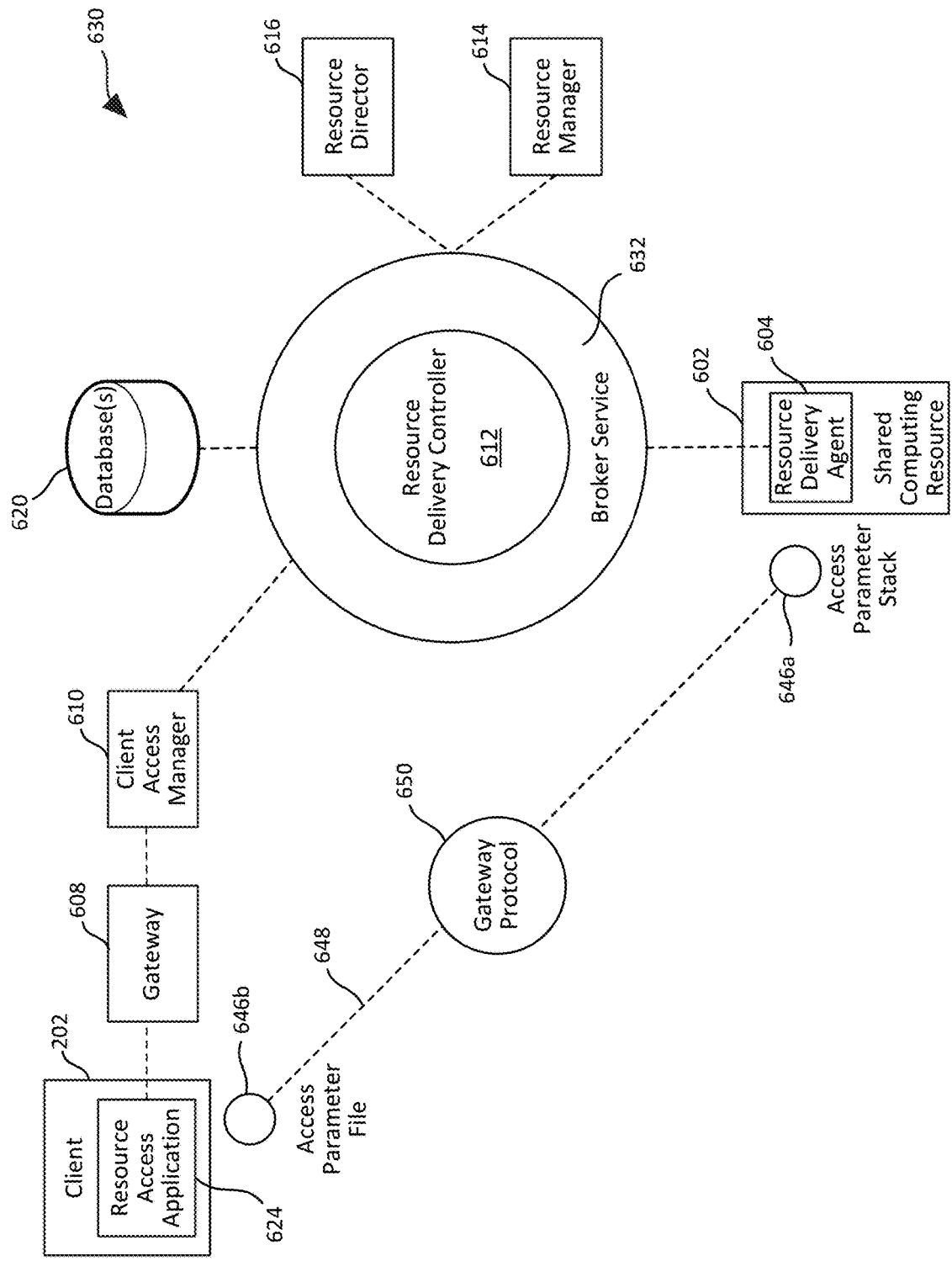
FIG. 6B illustrates an example deployment of a resource delivery system such as that shown in FIG. 6A.

The monitoring agents may provide application performance management for the resource delivery system 600. For example, based upon one or more monitored performance conditions or metrics, the resource delivery system 600 may be dynamically adjusted, for example periodically or in real-time, to optimize application delivery by the resource delivery agents 604 to the clients 202 based upon network environment performance and conditions FIG. 6B illustrates an example deployment 630 of a resource delivery system 600, such as that shown in FIG. 6A. Such a deployment may be referred to as a "Site." A Site may be made up of machines with dedicated roles that allow for scalability, high availability, and failover, and may provide a solution that is secure by design. As discussed above, such a Site may include servers and/or desktop machines installed with resource delivery agents 604, and one or more resource delivery controller(s) 612, which may manage access to such servers/machines. FIG. 6B illustrates one such resource delivery agent 604, and one such resource delivery controller 612. As shown in FIG. 6B, the resource delivery controller 612 may include a broker service 632. The resource delivery agent 604 may enable users to connect to desktops and/or applications. It may be installed on server or desktop machines in a datacenter for most delivery methods, but it may also be installed on physical personal computers (PCs) for Remote PC Access. In some implementations, the resource delivery controller 612 may be made up of independent Windows services that may manage resources, applications, and/or desktops, and may optimize and balance user connections.

In some embodiments, client devices 202 may not directly access the resource delivery controller 612. Instead, the resource delivery agent 604 and the client access manager 610 may serve as intermediaries between client devices 202 and the resource delivery controller 612. When users log on using the client access manager 610, their credentials may pass through to the broker service 632 on the resource delivery controller 612. The broker service 632 may then obtain profiles and available resources based on the policies set for them.

Figure 6C:
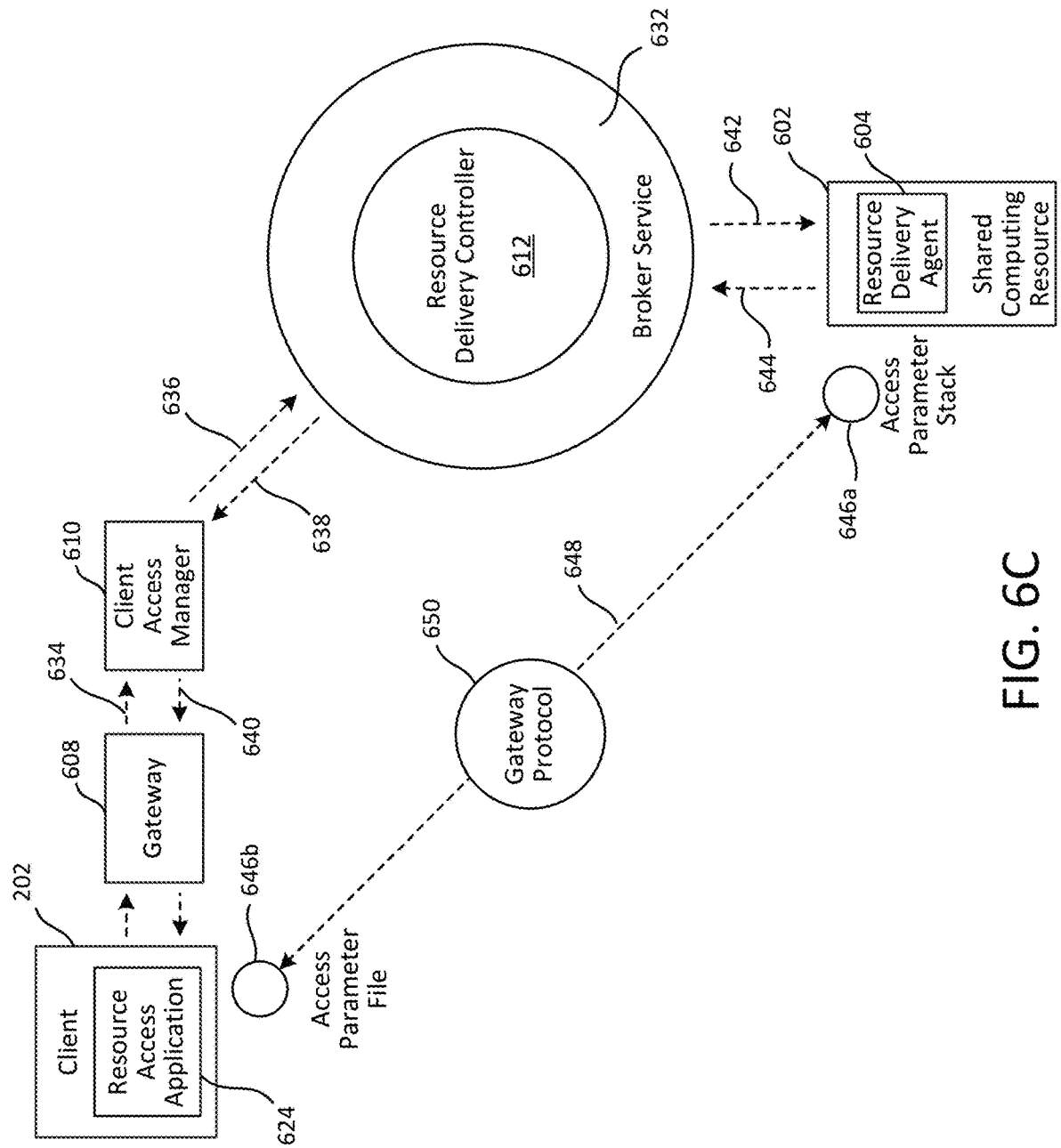
FIG. 6C illustrates an example process for handling user connections within the deployment shown in FIG. 6B.

FIG. 6C illustrates an example process for handling user connections within the deployment 630 shown in FIG. 6B. As indicated by arrows 634 and 635, to start a session, a user may cause the client device 202 to connect (via the gateway 608) to the client access manager 610. Such a connection may, for example, be established using the resource access application 624. As noted above, the resource access application 624 may either be installed on the client device 202 or accessible from a web server via a web browser on the client device 202.

As indicated by arrow 636, the user's credentials may then move through this pathway to access the broker service 632 of resource delivery controller 612. In some implementations, such communications may be encrypted to protect the security of such credentials. The broker service 632 may determine which desktops and/or applications the user is allowed to access. After the credentials have been verified, information about available applications and/or desktops may be sent back to the client device 202 through the pathway between the client access manager 610 and the resource access application 624, as indicated by arrows 638, 640, and 641. The user of the client device 202 may thus be provided with a list of available applications and/or desktops. When the user selects an application or desktop from this list, an indication of the selected resource goes back down the previously described pathway to the resource delivery controller 612. The resource delivery controller 612 may then select an appropriate resource delivery agent 604 to host the selected applications or desktop.

As indicated by arrow 642, the resource delivery controller 612 may send a message to the selected resource delivery agent 604 with the user's credentials, and may then send pertinent data about the user and the connection to the resource delivery agent 604. The resource delivery agent 604 may then accept the connection and, as indicated by arrows 644, 638, 640, and 641, may send a set of access parameters (stored in an access parameter stack 646a) back through the same pathways to the resource access application 624. In particular, the set of access parameters may be collected by the client access manager 610 and then sent to the resource access application 624 where they may be stored as an access parameter file 646b. In some implementations, the access parameter file 646b may be created as part of a protocol conversation between the client access manager 610 and the resource access application 624. In other implementations, the client access manager 610 may convert the access parameters to the file 646b, and that file 646b may then be downloaded to the client device 202. In some implementations, the access parameters may remain encrypted throughout this process.

The access parameter file 646b that is then stored on the client device 202 may be used to establish a direct connection 648 between the client device 202 and the access parameter stack 646a running on the resource delivery agent 604. As illustrated, the connection 648 between the client device 202 and the resource delivery agent 604 may use a gateway protocol 650. In some implementations, the gateway protocol 650 may include a feature that enables the client device 202 to immediately reconnect to the resource delivery agent 604 if the connection 648 is lost, rather than having to relaunch through the management infrastructure (including the client access manager 610, the resource delivery controller 612, etc.).

After the client device 202 connects to the resource delivery agent 604, the resource delivery agent 604 may notify the resource delivery controller 612 that the user is logged on. The resource delivery controller 612 may then send this information to the database(s) 620 (shown in FIGS. 6A, 6B and 6D) and the monitor service 660 (shown in FIG. 6D) of the delivery controller 612 may also start logging data in the database(s) 620.

Figure 6D:
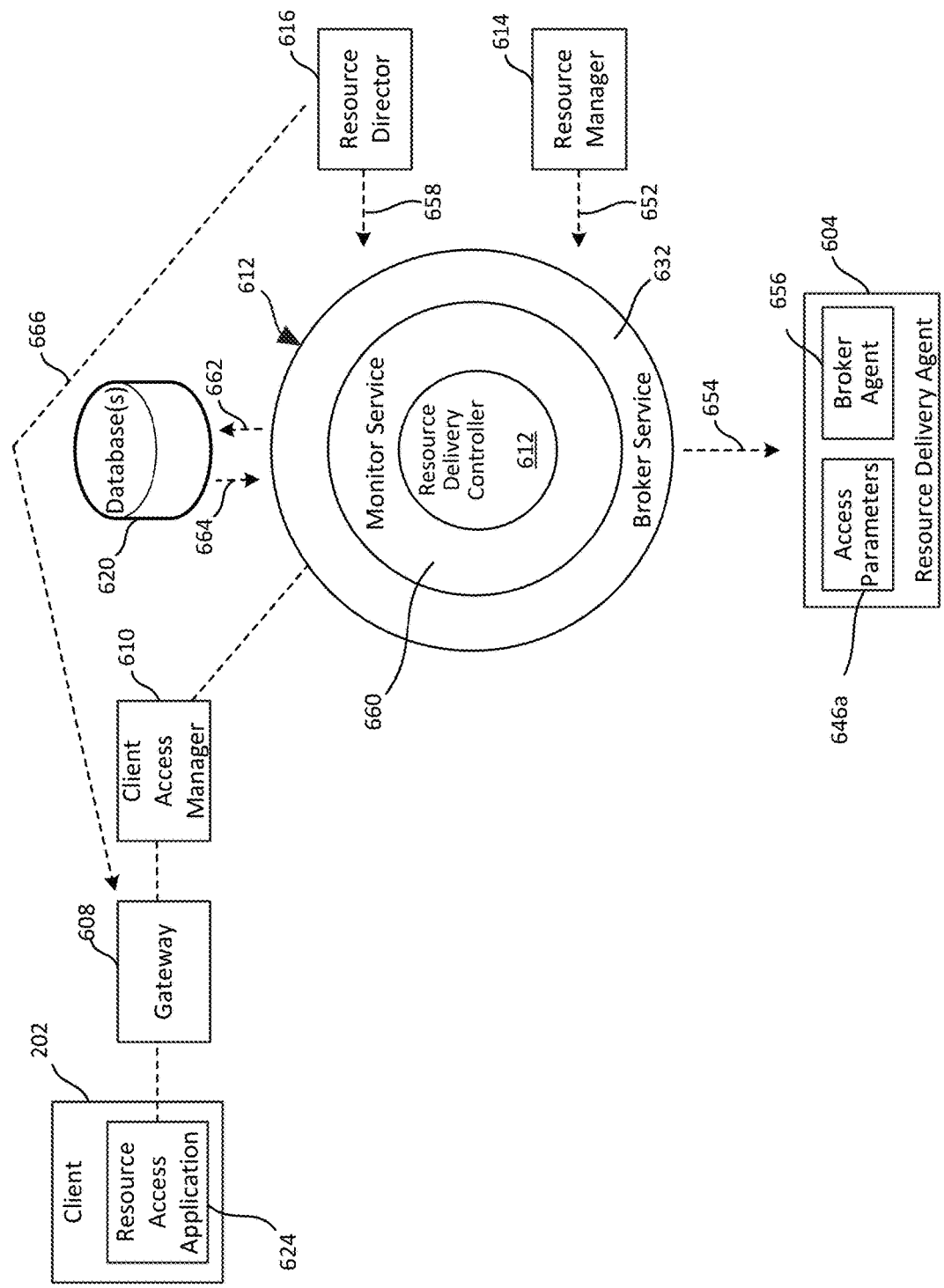
FIG. 6D shows examples of paths through which the resource manager and the resource monitor shown in FIG. 6B may access stored data.

Such sessions between client devices 202 and resource delivery agents 604 produce data that system administrators can access through the resource manager 614 and/or the resource director 616. FIG. 6D shows examples of paths through which the resource manager 614 and the resource director 616 may access such data in some embodiments. As indicated by the arrows 652 and 654, administrators may use the resource manager 614 to access real-time data from the broker agent 656 of a resource delivery agent 604 (via the broker service 632 of the resource delivery controller 612). The resource director 616 may access the same data, as indicated by arrows 658 and 654, plus any historical data the monitor service 660 of the resource delivery controller 612 stores in the database(s) 620, as indicated by arrows 658, 662 and 664. Further, as indicated by arrow 666, the resource director 616 may also access data from the gateway 608 for help desk support and troubleshooting.

Within the resource delivery controller 612, the broker service 632 may report session data for every session on the machine providing real-time data. The monitor service 660 may also track the real-time data and store it as historical data in the database(s) 620. In some implementations, the resource manager 614 may communicate with the broker service 632 and may access real-time data. The resource director 616 may communicate with the broker service 632 to access the database(s) 620.

An example process for enabling the delivery of applications and/or desktops will now be described. First, the machines that are to deliver applications and/or desktops may be set up with "Machine Catalogs." Then, "Delivery Groups" may be created that specify the applications and/or desktops that are to be made available (using machines in the Machine Catalogs), and which users can access them. In some implementations, "Application Groups" may also be created to manage collections of applications.

Machine Catalogs are collections of virtual or physical machines that can be managed as a single entity. These machines, and the application and/or virtual desktops on them, are the resources that may be made available to users. All the machines in a Machine Catalog may have the same operating system and the same resource delivery agent 604 installed. They may also have the same applications and/or virtual desktops.

In some implementations, a master image may be created and used to create identical virtual machines in the catalog. For virtual machines, the provisioning method may be specified for the machines in that catalog. Valid machine types may, for example, include "Multi-session OS," "Single-session OS," and "Remote PC access." A Multi-session OS machine is a virtual or physical machine with a multi-session operating system. Such a machine may be used to deliver published applications (also known as server-based hosted applications) and published desktops (also known as server-hosted desktops). These machines may allow multiple users to connect to them at one time. A Single-session OS machine is a virtual or physical machine with a single-session operating system. Such a machine may be used to deliver Virtual Desktop Infrastructure (VDI) desktops (desktops running single-session OSs that can optionally be personalized), virtual machine (VM)-hosted apps (applications from single-session OSs), and hosted physical desktops. Only one user at a time can connect to each of these desktops. A Remote PC access machine may enable remote users to access their physical office PCs from any device running the resource access application 624.

Delivery Groups may specify which users can access which applications and/or desktops on which machines. Delivery Groups may include machines from the Machine Catalogs, and Active Directory users who have access to the Site. In some implementations, users may be assigned to Delivery Groups by their Active Directory group, because Active Directory groups and Delivery Groups are ways to group users with similar requirements.

Delivery Groups may contain machines from more than one Machine Catalog, and Machine Catalogs may contribute machines to more than one Delivery Group. In at least some implementations, however, individual machines can only belong to one Delivery Group at a time.

The specific resources that users in the Delivery Group can access may be defined. For example, to deliver different applications to different users, all of the applications may be installed on the master image for one Machine Catalog and enough machines may be created in that catalog to distribute among several Delivery Groups. Delivery Groups may then be configured to deliver a different subset of applications that are installed on the machines.

Application Groups may provide application management and resource control advantages over using more Delivery Groups. Using a "tag restriction" feature, existing machines may be used for more than one "publishing" task, saving the costs of deployment and managing additional machines. A tag restriction can be thought of as subdividing (or partitioning) the machines in a Delivery Group. Application Groups may also be helpful when isolating and troubleshooting a subset of machines in a Delivery Group.

"Tags" may be strings that identify items such as machines, applications, desktops, Delivery Groups, Application Groups, and policies. After creating a tag and adding it to an item, certain operations may be tailored to apply to only items that have a specified tag.

In some implementations, tags may be used to tailor search displays is the resource manager 614. For example, to display only applications that have been optimized for testers, a tag named "test" may be created and may then be added (applied) to those applications. A search performed by the resource manager 614 may then be filtered with the tag "test".

In some implementations, tags may be used to "publish" applications from an Application Group or specific desktops from a Delivery Group, considering only a subset of the machines in selected Delivery Groups. Using an Application Group or desktops with a tag restriction may be helpful when isolating and troubleshooting a subset of machines in a Delivery Group.

In some implementations, tags may be used to schedule periodic restarts for a subset of machines in a Delivery Group. Using a tag restriction for machines may, for example, enable the use of new PowerShell cmdlets to configure multiple restart schedules for subsets of machines in a Delivery Group.

In some implementations, tags may be used to tailor the application (assignment) of particular policies to a subset of machines in Delivery Groups, Delivery Group types, or organizational units (OUs) of a Site that have (or do not have) a specified tag. For example, if a particular policy is to be applied only to the more powerful workstations, a tag named "high power" may be applied to those machines and the policy may be set to apply to only machines to which the high power tag has been applied. Tags may additionally or alternatively be applied to particular Delivery Groups and one or more policies may be set to apply only the Delivery Groups to which such tags have been applied.

In some embodiments, the resource manager 614 may be used to create or edit a tag restriction for a desktop in a shared Delivery Group or an Application Group. In some implementations, creating such a tag restriction may involve several steps. First, a tag may be created and then added (applied) to one or more machines. Second a group may be created or edited to include the tag restriction, thus restricting launches to machines with the applied tag. A tag restriction may extend the machine selection process of the broker service 632. In particular, the broker service 632 may select a machine from an associated Delivery Group subject to access policy, configured user lists, zone preference, and launch readiness, plus the tag restriction (if present). For applications, the broker service 632 may fall back to other Delivery Groups in priority order, applying the same machine selection rules for each considered Delivery Group.

As noted above, the resource delivery system 600 described in connection with FIGS. 6A-6D may provide virtualization solutions that give administrators control of virtual machines, applications, and security while providing anywhere access for any device. As was also noted above, the resource delivery system 600 may also enable end users to access applications and desktops independently of the operating systems and interfaces of the client devices 202 such end users are operating.

Figure 6E:
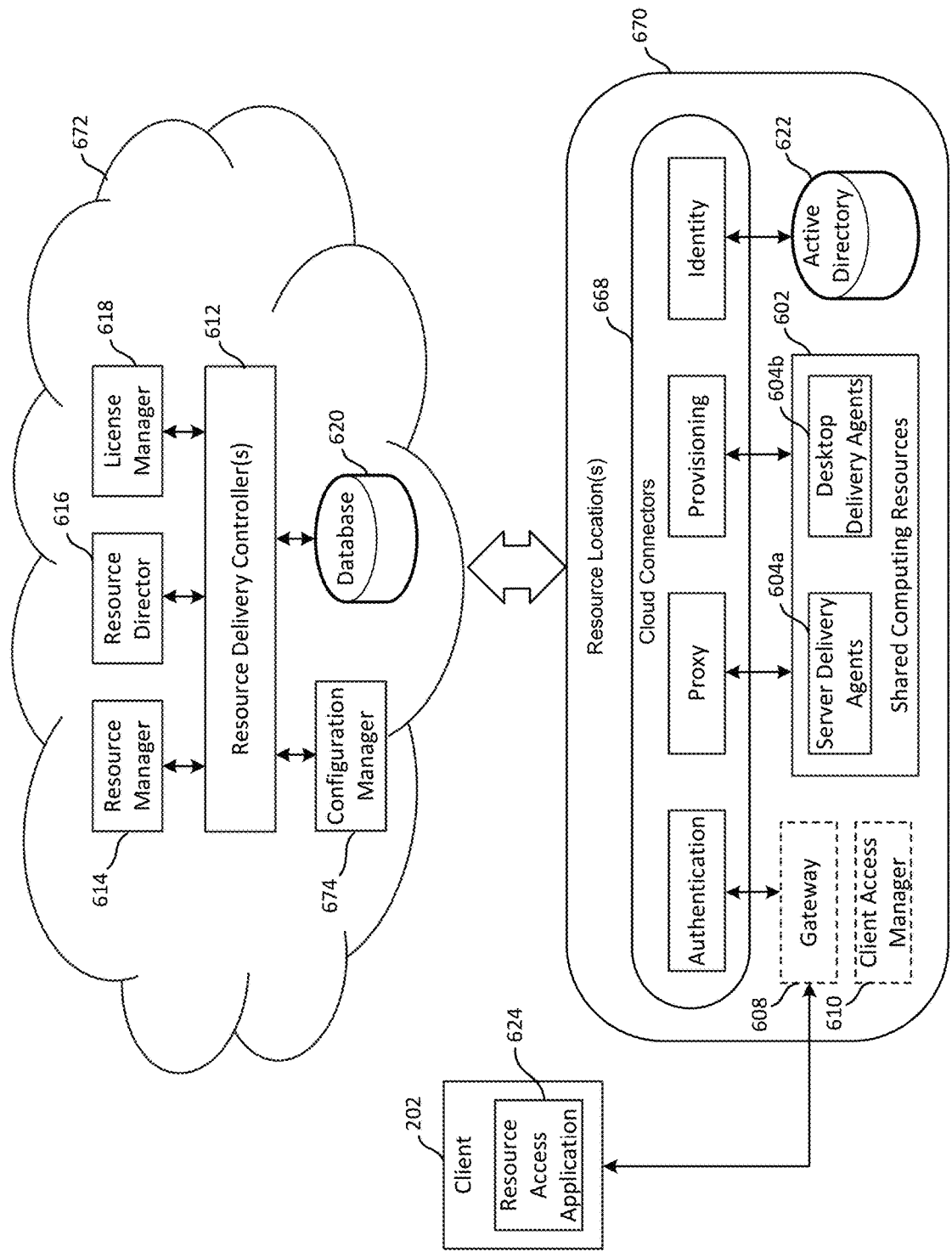
FIG. 6E is a block diagram of a resource delivery system similar to the shown in FIG. 6A but in which several elements are provided as a service within a cloud-based computing environment.

In some implementations, one or more components of the resource delivery system 600 may be provided as a service within a cloud-based computing environment. FIG. 6E illustrates an example of such an implementation. As shown in FIG. 6E, one or more cloud connectors 668 may enable various resources at one or more locations 670 outside of a cloud computing environment 672 to interface with various components within the cloud computing environment 672. As illustrated, resource location(s) 670 may include the machines and other resources that deliver applications and/or desktops to client devices 202. As indicated by dashed lines, the resource location 670 may optionally include the gateway 608 and/or the client access manager 610 previously described. In the illustrated example, the resource delivery controller(s) 612, the resource manager 614, the resource director 616, the license manager 618, and the database(s) 620 are all provided within the cloud computing environment 672. Further, as shown in FIG. 6E, a configuration manager 674 may additionally be hosted within the cloud computing environment 672 in some implementations. Examples of management functions that may be performed by the configuration manager 674 are described below. In some implementations, the cloud computing environment 672 may correspond to a public cloud computing infrastructure, such as AZURE CLOUD provided by Microsoft Corporation of Redmond, Washington, or AMAZON WEB SERVICES provided by Amazon.com, Inc., of Seattle, Washington.

In addition to serving as a channel for communication between the cloud computing environment 672 and the resource location(s) 670, the cloud connectors 668 may enable cloud management without requiring any complex networking or infrastructure configuration such as virtual private networks (VPNs) or Internet Protocol Security (IPsec) tunnels.

As noted above, the resource delivery controller(s) 612 may serve as the central control layer component in a deployment. The resource delivery controller(s) 612 may communicate through the cloud connectors 668 in each resource location 670 to distribute applications and/or desktops, authenticate and manage user access, broker connections between users and their virtual desktops and/or applications, optimize use connections, and/or load-balance use connections. In some implementations, the resource delivery controller(s) 612 may additionally track which users are logged on and where, which session resources the users have, and if users need to reconnect to existing applications. The resource delivery controller(s) 612 may further manage the state of desktops, starting and stopping them based on demand and administrative configuration, in some implementations.

The configuration manager 674 in the cloud computing environment 672 may (A) enable administrators to specify which services are to be made available to users via the resource access application, (B) customize the uniform resource locator (URL) that the resource access application 624 is to use to access the available resources, (C) customize the appearance of the user interface provided by the resource access application, such as logos, color, and preferences, (D) specify how users are to authenticate to the system, such as using the Active Directory 622, and/or (E) specify external connectivity for the resource locations 670.

As noted above, a resource location 670 may include at least one cloud connector 668 that serves as the communications channel between the components in the cloud computing environment 672 and the components in the resource location 670. In the resource location 670, the cloud connector(s) may act as a proxy for the resource delivery controller(s) 612 in the cloud computing environment 672.

As noted above, the physical or virtual machines that deliver applications and/or desktops may include resource delivery agents 604a, 604b. The resource delivery agents 604 may register with at least one cloud connector 668. After registration, connections may be brokered from those resources to users. The resource delivery agents 604 may further establish and manage the connection between the machine and the client device 202, and apply policies that are configured for the session. The resource delivery agents 604 may communicate session information to the cloud connector 668 through the broker agent 656 (shown in FIG. 6D) in the resource delivery agent 604. As noted above, in some implementations, such a broker agent 656 may host multiple plugins and collect real-time data.

A host connection may be established that enables communication between components in the cloud computing environment 672 and the resource delivery agents 604 on the shared computing resources 602. Specifications for such host connections may include (A) the address and credentials to access the host, (B) the tool that is to be used to create VMs, (C) the storage method to use, (D) the machines to use for storage, and/or (E) which network the VMs will use.

G. Example Architecture of a Resource Virtualization Server

Figure 7:
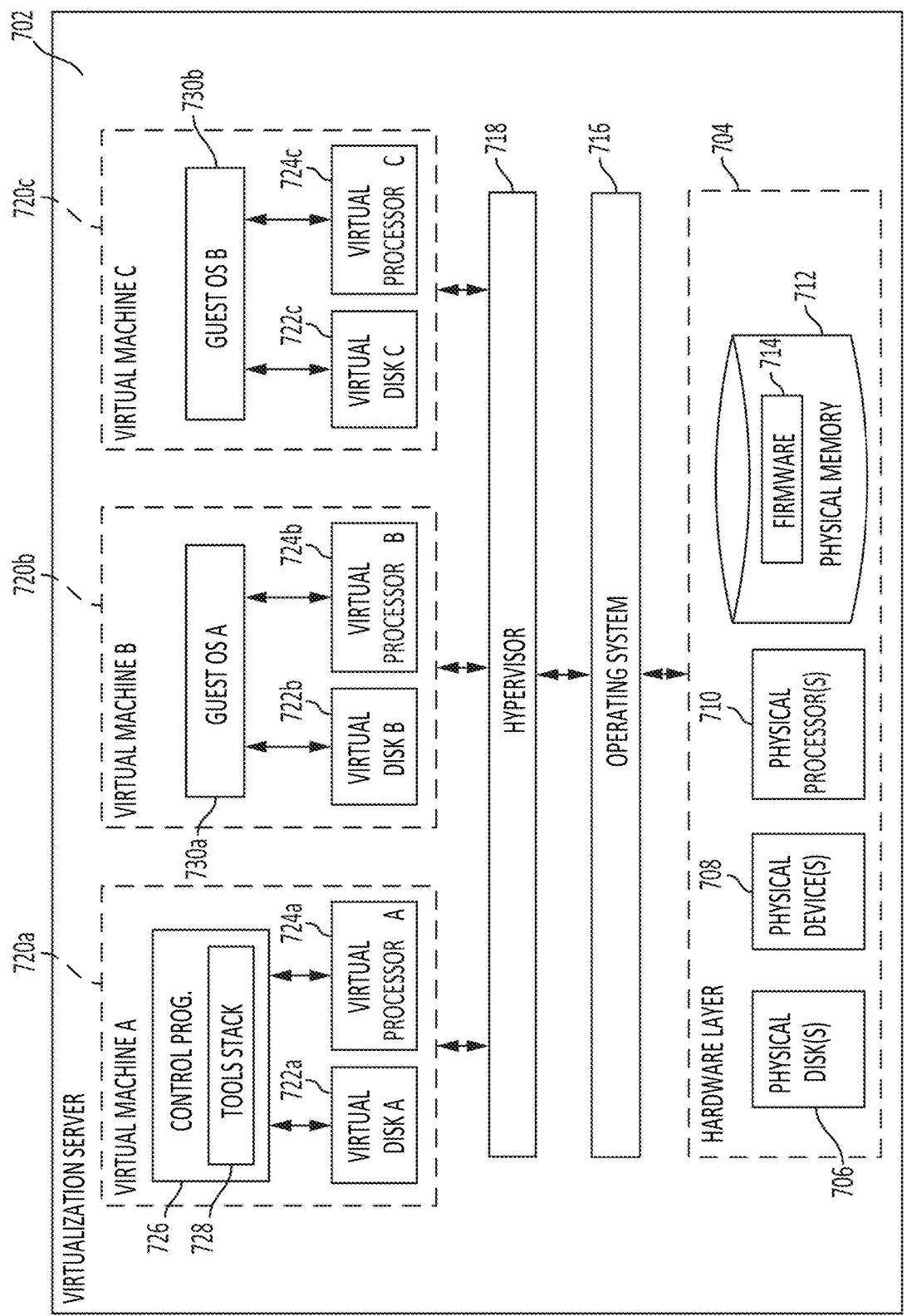
FIG. 7 depicts an illustrative virtualized (hypervisor) system architecture that may be used in accordance with one or more illustrative aspects described herein.

FIG. 7 shows an example architecture of an illustrative resource virtualization server 702. As shown, the resource virtualization server 702 may be configured to provide virtual desktops and/or virtual applications to one or more client access devices, such as the clients 202. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Instances of the operating system may be physical (e.g., one operating system per physical device) or virtual (e.g., many instances of an OS running on a single physical device). The applications may be executed on a local device, or executed on a remotely located device (e.g., remoted).

The virtualization server 702 illustrated in FIG. 7 may be deployed as and/or implemented by one or more of the servers 204 described above, the servers that make up a virtualization server system, or by other known computing devices. Included in the virtualization server 702 is a hardware layer 704 that may include one or more physical disks 706, one or more physical devices 708, one or more physical processors 710, and one or more physical memories 712. In some embodiments, firmware 714 may be stored within a memory element in physical memory 712 and be executed by one or more of the physical processors 710. The virtualization server 702 may further include an operating system 716 that may be stored in a memory element in physical memory 712 and executed by one or more of physical processors 710. Still further, a hypervisor 718 may be stored in a memory element in the physical memory 712 and be executed by one or more of the physical processors 710. Presence of the operating system 716 may be optional such as in a case where the hypervisor 718 is a Type 1 hypervisor; that is, a bare-metal hypervisor installed directly on the hardware layer 704. In some implementations, the hypervisor 718 may be a Type 2 hypervisor, which executes on a host operating system, such as the OS 716, which may provide virtualization services such as I/O device support and memory management.

Executing on one or more of the physical processors 710 may be one or more virtual machines 720a-c (generally 720). The virtual machines 720 may have respective virtual disks 722a-c and virtual processors 724a-c. In some embodiments, a first virtual machine 720a may execute, using the virtual processor 724a, a control program 726 that includes a tools stack 728. The control program 726 may be referred to as a control virtual machine, Domain 0, Dom0, or other virtual machine used for system administration and/or control. In some embodiments, one or more of the virtual machines 720b-c may execute, using a virtual processor 724b-c, a guest operating system 730a-b (generally 730).

The physical devices 708 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 702. The physical memory 712 in hardware layer 704 may include any type of memory. The physical memory 712 may store data, and in some embodiments may store one or more programs, or set of executable instructions. FIG. 7 illustrates an embodiment where firmware 714 is stored within physical memory 712 of virtualization server 702. Programs or executable instructions stored in physical memory 712 may be executed by the one or more of the processors 710 of the virtualization server 702.

The virtualization server 702 may also include hypervisor 718. In some embodiments, the hypervisor 718 may be a program executed by processors 710 on the virtualization server 702 to create and manage any number of virtual machines 720. The hypervisor 718 may be referred to as a virtual machine monitor, or platform virtualization software. In some embodiments, the hypervisor 718 may be any combination of executable instructions and hardware that monitors virtual machines 720 executing on a computing machine. The hypervisor 718 may be a Type 2 hypervisor, where the hypervisor executes within operating system 716 executing on virtualization server 702. The virtual machines may then execute at a layer above hypervisor 718. In some embodiments, the Type 2 hypervisor may execute within the context of a user's operating system such that the Type 2 hypervisor interacts with the user's operating system. In other embodiments, one or more virtualization servers 702 in a virtualization environment may instead include a Type 1 hypervisor (not shown). A Type 1 hypervisor may execute on the virtualization server 702 by directly accessing the hardware and resources within hardware layer 704. That is, while the Type 2 hypervisor 718 accesses system resources through host operating system 716, as shown, a Type 1 hypervisor may directly access all system resources without host operating system 716. A Type 1 hypervisor may execute directly on one or more physical processors 710 of the virtualization server 702, and may include program data stored in the physical memory 712.

The hypervisor 718, in some embodiments, may provide virtual resources to the guest operating systems 730 or control programs 726 executing on virtual machines 720 in any manner that simulates the operating systems 730 or control programs 726 having direct access to system resources. System resources may include, but are not limited to, the physical devices 708, the physical disks 706, the physical processors 710, physical memory 712, and any other component included in the hardware layer 704 of the virtualization server 702. The hypervisor 718 may be used to emulate virtual hardware, partition physical hardware, virtualize physical hardware, and/or execute virtual machines that provide access to computing environments. In still other embodiments, the hypervisor 718 may control processor scheduling and memory partitioning for the virtual machine 720 executing on the virtualization server 702. Examples of hypervisor 718 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. In some embodiments, the virtualization server 702 may execute a hypervisor 718 that creates a virtual machine platform on which the guest operating systems 730 may execute. In these embodiments, the virtualization server 702 may be referred to as a host server. An example of such a virtualization server is Citrix Hypervisor® provided by Citrix Systems, Inc., of Fort Lauderdale, Florida.

The hypervisor 718 may create one or more virtual machines 720b-c (generally 720) in which guest operating systems 730 execute. In some embodiments, the hypervisor 718 may load a virtual machine image to create a virtual machine 720. The virtual machine image may refer to a collection of data, states, instructions, etc. that make up an instance of a virtual machine. In other embodiments, the hypervisor 718 may execute guest operating system 730 within the virtual machine 720. In still other embodiments, the virtual machine 720 may execute the guest operating system 730.

In addition to creating the virtual machines 720, the hypervisor 718 may control the execution of at least one virtual machine 720. In other embodiments, the hypervisor 718 may present at least one virtual machine 720 with an abstraction of at least one hardware resource provided by the virtualization server 702 (e.g., any hardware resource available within hardware layer 704). In other embodiments, the hypervisor 718 may control the manner in which the virtual machines 720 access physical processors 710 available in the virtualization server 702. Controlling access to the physical processors 710 may include determining whether the virtual machine 720 should have access to the processor 710, and how physical processor capabilities are presented to the virtual machine 720.

As shown in FIG. 7, the virtualization server 702 may host or execute one or more virtual machines 720. A virtual machine 720 may be a set of executable instructions and/or user data that, when executed by processor 710, may imitate the operation of a physical computer such that the virtual machine 720 may execute programs and processes much like a physical computing device. While FIG. 7 illustrates an embodiment where the virtualization server 702 hosts three virtual machines 720, in other embodiments the virtualization server 702 may host any number of virtual machines 720. The hypervisor 718, in some embodiments, may provide the virtual machines 720 with unique virtual views of the physical hardware, including the memory 712, the processor 710, and other system resources 706, 708 available to the respective virtual machines 720. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 718 may create one or more unsecure virtual machines 720 and one or more secure virtual machines 720. The unsecure virtual machines 720 may be prevented from accessing resources, hardware, memory locations, and programs that the secure virtual machines 720 may be permitted to access. In other embodiments, the hypervisor 718 may provide the virtual machines 720 with substantially similar virtual views of the physical hardware, memory, processor, and other system resources available to the virtual machines 720.

The virtual machines 720 may include respective virtual disks 722*a-c* (generally 722) and virtual processors 724*a-c* (generally 724.) The virtual disk 722, in some embodiments, may be a virtualized view of one or more physical disks 706 of the virtualization server 702, or a portion of one or more physical disks 706 of the virtualization server 702. The virtualized view of the physical disks 706 may be generated, provided, and managed by the hypervisor 718. In some embodiments, the hypervisor 718 may provide the virtual machines 720 with unique views of the physical disks 706. Thus, in these embodiments, a particular virtual disk 722 included in a respective virtual machine 720 may be unique when compared with other virtual disks 722.

The virtual processor 724 may be a virtualized view of one or more physical processors 710 of the virtualization server 702. In some embodiments, the virtualized view of physical processors 710 may be generated, provided, and managed by the hypervisor 718. In some embodiments, the virtual processor 724 may have substantially all of the same characteristics of at least one physical processor 710. In other embodiments, the virtual processor 710 may provide a modified view of the physical processors 710 such that at least some of the characteristics of the virtual processor 724 are different from the characteristics of the corresponding physical processor 710.

H. Detailed Description of Example Embodiments of the User Authentication System Introduced in Section A The present disclosure relates, at least in part, to authenticating a first user to an application in a manner that prohibits another second user from using the first user's credentials to access the application. As described above in Section A, in some implementations, a conversion process specific to the first user 102*a* may be used to convert an inputted credential(s) (e.g., character keycodes 104) to different credentials (e.g., character keycodes 106), and using the different credentials to authenticate the first user to the application 108. A credential, as used herein, may be a password, a pin code, a pin, a passphrase, or other inputs that may be used to authenticate a user. In some implementations, the credential may additionally or alternatively include a username or another login identifier (e.g., an email address, a phone number, etc.). Credentials may be provided by a user via a keyboard input (physical or virtual), a mouse input, a touchscreen input, or using other peripherals of the client device 202. The user may provide the credentials in the form of character keycodes corresponding to characters shown on a typical keyboard, or corresponding to some custom characters that may be made available via a customized keyboard or via a display screen of the client device 202. In some implementations, the user may provide the credentials in the form of a voice input that may be captured by a microphone of the client device 202, and the client device 202 (or another component described herein) may determine the character keycodes from the voice input (e.g., using one or more speech-to-text processing techniques). Example character keycodes representing credentials may be "citrix123", "p@ssW0rd", "% xyz % abc %", etc.

Figure 8A:
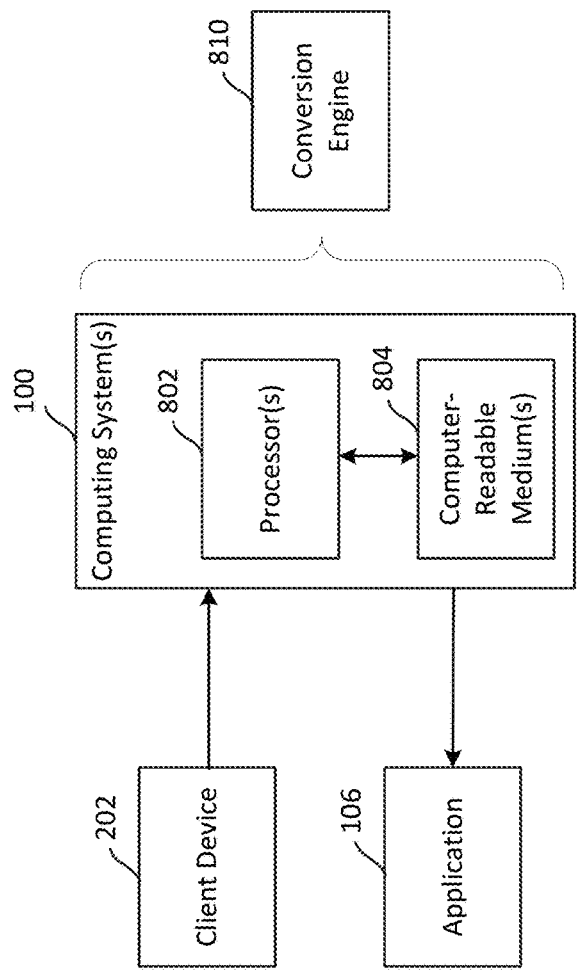
FIG. 8A is a block diagram illustrating example components of one or more computing systems, shown in FIG. 1.

FIG. 8A is a block diagram illustrating example components that may be used to implement the functionalities described herein according to an example embodiment. In the example embodiment shown in FIG. 8A, the computing system(s) 100 may include one or more processors 802 as well as one or more computer-readable mediums 804 that are encoded with instructions to be executed by the processor(s) 802. In some implementations, such instructions may cause the processor(s) 802 to implement one or more, or possibly all, of the operations of the computing system(s) 100 described herein.

The processor(s) 802 and computer-readable medium(s) 804 may be disposed at any of a number of locations within a computing network, such as the network environment 200 described above (in Section B) in connection with FIG. 2. In some implementations, for example, the processor(s) 802 and the computer-readable medium(s) 804 embodying one or more of the components described herein may be located within one or more of the clients 202, the servers 204 and/or the computing system 300 that are described above (in Sections B and C) in connection with FIGS. 2 and 3, and/or may be located within a cloud computing environment 400, such as that described above (in Section D) in connection with FIG. 4.

As shown in FIG. 8A, in some implementations, the computing system(s) 100 may include a conversion engine 810. The conversion engine 810 may be configured to determine a conversion process associated with the user 102. To achieve this, the conversion engine 810, in some implementations, may include a storage configured to store data representing the conversion process associated with the user 102. Such data representing the conversion process may include a user identifier for the user 102. In some implementations, the conversion process may be associated with a particular application, and in such implementations, the data representing the conversion process may also include an application identifier for the application 108. In some implementations, the conversion process may be associated with the type of credential to be converted. For example, a first conversion process may be used to convert a username, while a second conversion process may be used to convert a password. In other implementations, the conversion engine 810 may be in communication with another storage or component that stores the data representing the conversion process associated with the user 102.

The conversion engine 810 may further be configured to apply the conversion process to the inputted character keycodes 104 to convert the inputted character keycodes to different character keycodes 106. To achieve this, the conversion engine 810 may include software code and/or instructions that enables the conversion engine 810 to execute the conversion process. For example, the conversion engine 810 may implement an encoding technique, a random data/salt generator, or other techniques described below. In other implementations, the conversion engine 810 may be in communication with another component that is configured to execute the conversion process.

The conversion engine 810 may implement multiple conversion processes, where individual conversion processes may be specific to a user (and optionally an application). Such conversion processes may include use of one or more encoding techniques, use of salt, etc. For example, a first plurality of character keycodes may be "citrix", which may be converted to a second plurality of character keycodes "%+64+:".

An example conversion process may involve using a table or mapping (e.g., a predefined table/mapping) of one character keycode to another character keycode. In this example encoding technique, an input character keycode may be replaced with a corresponding different character keycode according to the table/mapping.

Another example conversion process may involve offsetting a character keycode by a set number of positions. For example, an inputted character keycode "A" may be replaced with the character keycode "C" if the offsetting value is set to 2.

Another example conversion process may involve converting character keycodes in a sequential manner, one-by-one in the order the character keycodes are received. For example, the conversion process may convert a first inputted character keycode to first different character keycode, then convert a second inputted character keycode to a second different character keycode, etc.

Another example conversion process may involve converting character keycodes in a cumulative manner. For example, the conversion process may convert a first inputted character keycode to a first different character keycode, then receive a second inputted character keycode, and convert the first and second inputted character keycode to second different character keycode.

Another example conversion process may involve replacing one inputted character keycode with more than one character keycodes. For example, an inputted character keycode "A" may be replaced with the character keycodes "XYZ."

Another example conversion process may involve using salt/random data with the inputted character keycodes, and then applying one of the other example conversion processes described above, relating to replacing the inputted character keycodes and the random data with different character keycodes. For example, the salt/random data and the inputted character keycodes may be provided as inputs to an encoding function. In such examples, the salt/random data may be stored as part of the data representing the conversion process, so that the salt/random data can be used to generate the same different character keycodes for future authentication requests from the user 102.

Another example conversion process may involve adding random data to the inputted character keycodes, and then applying a hash function to determine the different character keycodes.

The conversion engine 810 may store data representing the conversion process, along with any other data/information needed to execute the conversion process. For example, in the case where a predefined table/mapping is used to replace an inputted character keycode, the conversion engine may store the predefined table/mapping. Such predefined table/mapping may be different for different users. As another example, in the case that random data is added to the inputted character keycodes, the conversion engine 810 may store the random data. Such random data may be different for different users.

In the example embodiment shown in FIG. 8A, after the inputted character keycodes 104 are converted by the conversion engine 810, the computing system(s) 100 may send the different character keycodes 106 to the application 108 to authenticate the user 102.

Figure 8B:
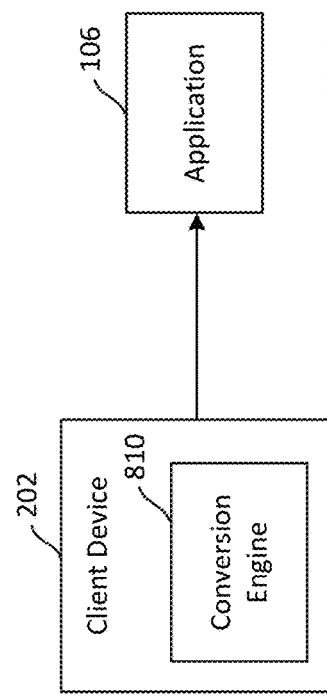
FIG. 8B is a block diagram illustrating example components of a client device, shown in FIG. 1.

FIG. 8B is a block diagram illustrating example components that may be used to implement the functionalities described herein according to another example embodiment. In the example embodiment shown in FIG. 8B, the conversion engine 810 may be included in the client device 202. The client device 202 may send the different character keycodes 106 to the application 108 either directly or indirectly. As described above in connection with FIG. 3 (in Section C), the client device 202 may include one or more components, such as, a processor(s) 302 and memory 304/306 that cause the client device 202 to implement one or more, or possibly all, of the operations of the computing system(s) 100 described herein. The client device 202 may be disposed at any of a number of locations within a computing network such as the network environment 200 described above (in Section B) in connection with FIG. 2. In some implementations, for example, the components of the client device 202 described herein may be located within a cloud computing environment 400 such as that described above (in Section D) in connection with FIG. 4.

In some implementations, the conversion engine 810 may be part of the resource access application 522 described above in connection with FIGS. 5A-5D (in Section E), and may operate on the client device 202 to control access to a SaaS application 508 or other resource, e.g., as described below in connection with FIGS. 9A-9B.

In other implementations, the conversion engine 810 may be part of the resource access application 624 described above in connection with FIGS. 6A-6E (in Section F), and may operate on the client device 202, e.g., as described below in connection with FIGS. 10A-10B, to control access to an application delivered via a shared computing-resource 602.

In some implementations, the conversion engine 810 may be included in one or more components described above in connection with FIGS. 6A-6E (in Section F). For example, the conversion engine 810 may be included in the shared computing resource 602, e.g., as a component of the resource delivery agent 604. In such implementations, the conversion engine 810 may operate as described below in connection with FIGS. 11A-11B, to control access to an application delivered via the shared computing-resource 602. In such implementations, the computing system(s) 100 may include one or more components of, and/or operate in conjunction with, the resource delivery system 600 shown in FIGS. 6A-6E and described below in Section F.

In some implementations, the data representing the conversion process may be stored separately from the conversion engine 810, e.g., within the resource management services 502 (shown in FIGS. 5A-B), within the database(s) 620 (shown in FIG. 6A-E), at the client device 202, or elsewhere, and may be provided to the conversion engine 810 at the computing system(s) 100 based on authenticating the identity of the user 102 operating the client device 202. In some implementations, the computing system(s) 100 may include a user preference service, separate from the conversion engine 810, that may store the data representing the conversion process. In some implementations, the user preference service may be implemented as a separate service, or may instead be embodied by the single sign-on service 520 (or some other component within the resource management services 502), or by the resource delivery controller(s) 612.

In some implementations, the conversion engine 810 may send the different character keycodes to the application 108 as character keycodes are inputted by the user 102. For example, the user 102 may input a first character keycode, the conversion engine 810 may convert the first character keycode into a first different character keycode, and send the first different character keycode to the application 108. Then, the conversion engine 810 may convert a second character keycode, inputted by the user 102, into a second different character keycode, and send the second different character keycode to the application 108. In other implementations, the conversion engine 810 may determine the different character keycodes as character keycodes are inputted by the user 102, and may send the different character keycodes corresponding to the entirety of the inputted credential after the user 102 is done inputting character keycodes.

Figure 9A:
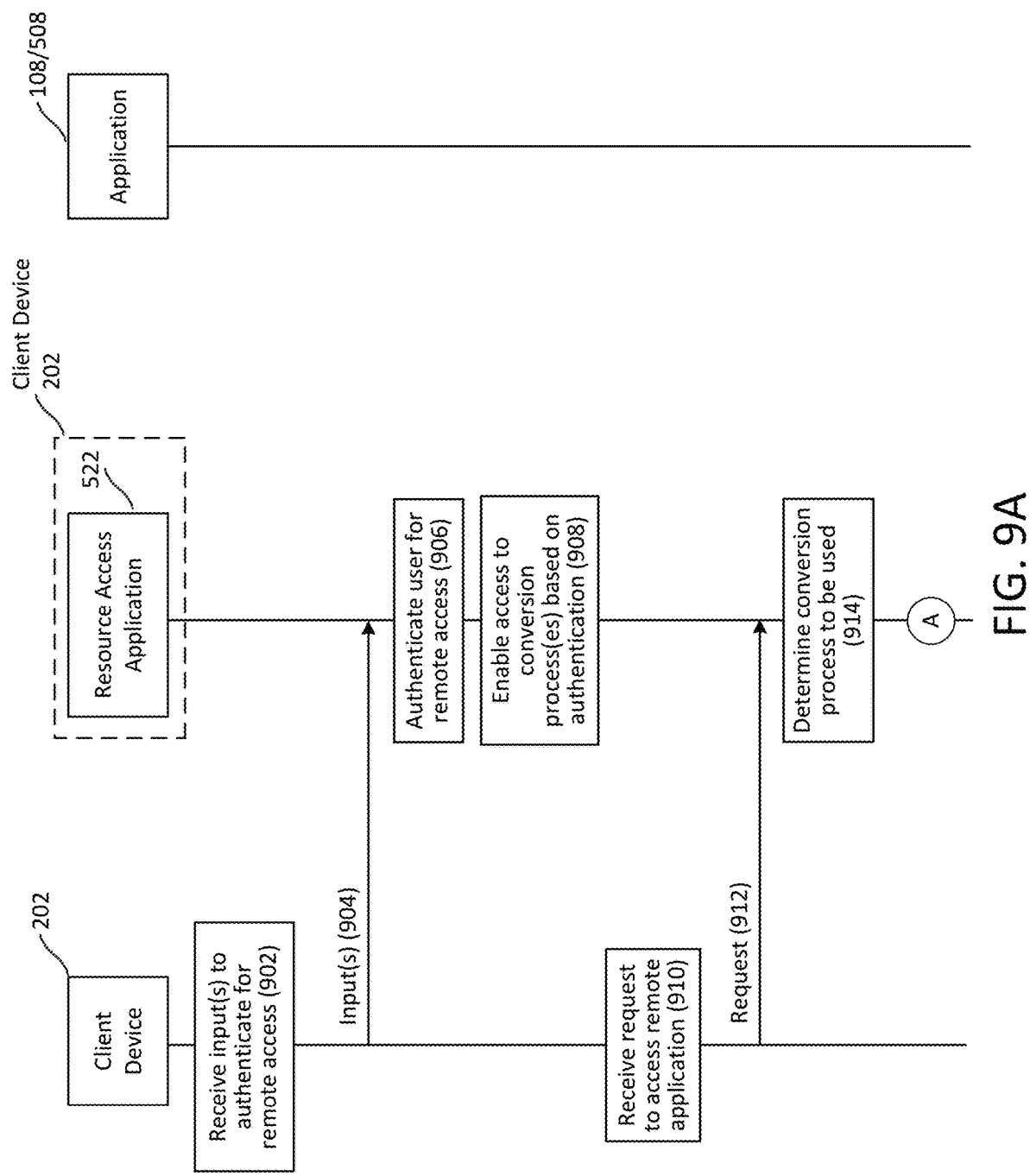
FIGS. 9A and 9B show an example signal diagram according to an example implementation of the system shown in FIGS. 8A and 8B.
Figure 9B:
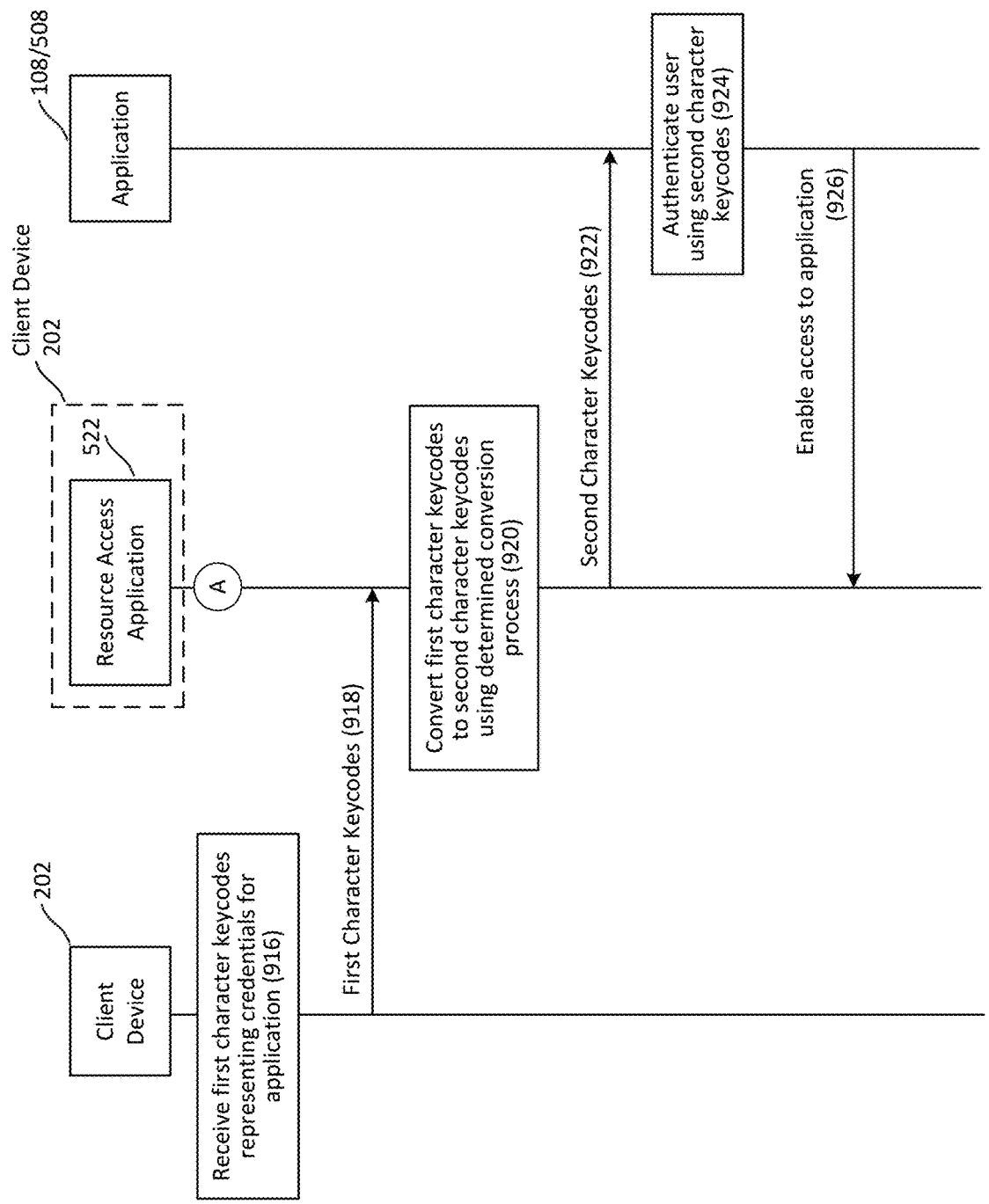

FIGS. 9A-9B illustrate an example signal flow diagram according to an example implementation of the user authentication system. In this example, the user 102 may access the application 108, which may be a SaaS application 508, via the multi-resource access system 500 (described above in relation to FIGS. 5A-5D in Section E), and the conversion engine 810 may be part of the resource access application 522. As Section E describes, the resource access application 522 may, for example, include a browser (e.g., a specialized browser) that can be used to access internet-based resources, such as the SaaS application 508.

Referring to FIG. 9A, the client device 202 may receive (902) input(s) to authenticate the user 102 for remote access. Such input(s) may be provided (904) to the resource access application 522 at the client device 202. In some implementations, the resource access application 522 may be installed on the client device 202. In other implementations, the resource access application 522 may be accessed using a web-browser. The resource access application 522 may authenticate (906) the user 102 for remote access using the input(s) received in step 902. Such authentication may be performed as described above in Section E, and may, for example, include interactions between the resource access application 522 and the identity service 516 (shown in FIG. 5B). The resource access application 522 may enable (908) access, by the user 102, to one or more conversion processes based on successful authentication for the multi-resource access system 500. For example, based on the user 102 authenticating for the resource access application 522, the resource access application 522 may make data/information available at the single sign-on service 520 accessible/available (as described above in Section E), which may include data representing a conversion process applicable to the user 102.

After the user 102 has access to the multi-resource access system 500, the client device 202 may receive (910) a request to access or enable additional functionality of an application 108 (e.g., a SaaS application 508). The client device 202 may provide (912) the request to the resource access application 522, or that request may be provided by the user 102 within/via the resource access application 522, such as by providing an input to the specialized browser of the resource access application 522 to launch the SaaS application 508. The resource access application 522 may determine (914) a conversion process to be used. In some implementations, the resource access application 522 may determine the conversion process based on the application 108 the user 102 wants to access. The conversion process may be determined using a user identifier for the user 102 associated with the resource access application 522. For example, one or more databases may store data associating the conversion process with the user identifier for the user 102 (and optionally associated with an application identifier for the application 108), and the conversion engine 810 may obtain data representing the conversion process from such database(s) following successful user authentication, as described above. As another example, the conversion process may be determined based on the type of credential to be converted (e.g., a conversion process for a username may be different than a conversion process for a password). In some implementations, such databases may be part of the single sign-on service 520 or another component of the resource management services 502.

Referring to FIG. 9B, the client device 202 may receive (916) first character keycodes representing credentials for the application 108. The client device 202 may provide the first character keycodes to the resource access application 522, or the first character keycodes may be inputted by the user 102 within/via the resource access application 522. The resource access application 522 may convert (920) the first character keycodes to second character keycodes using the determined conversion process. The resource access application 522 may include the conversion engine 810, and may perform the functionality described herein.

The resource access application 522 may provide (922) the second character keycodes to the application 108, using one or more components shown in FIGS. 5A-5D as described above in Section E. The application 108 may authenticate (924) the user 102 using the second character keycodes. Based on successful authentication, the application 108 may enable (926) access to the application 108 at the client device 202 via the resource access application 522, e.g., via the specialized browser described in Section E.

Figure 10A:
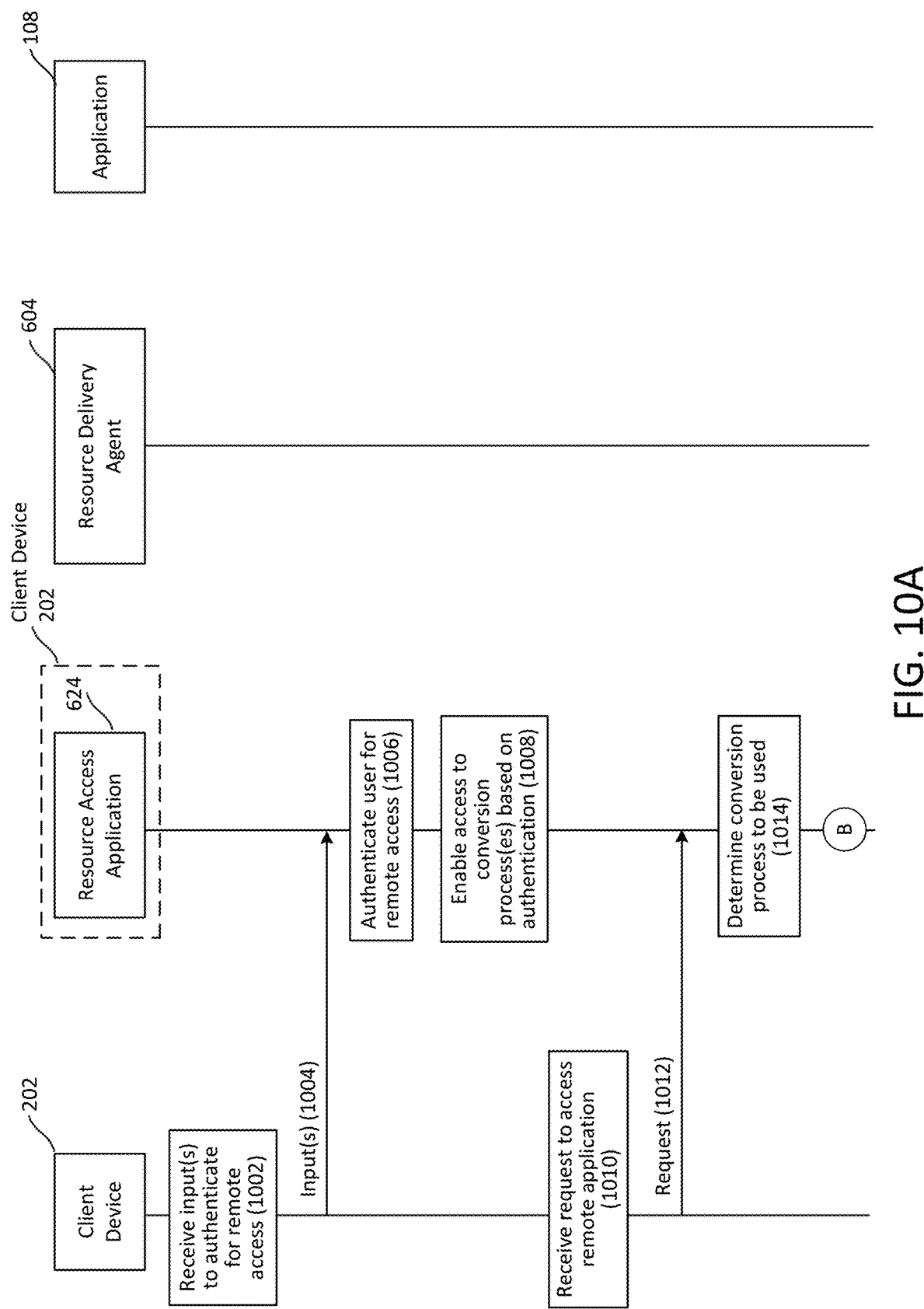
FIGS. 10A and 10B show an example signal diagram according to an example implementation of the system shown in FIGS. 8A and 8B.
Figure 10B:
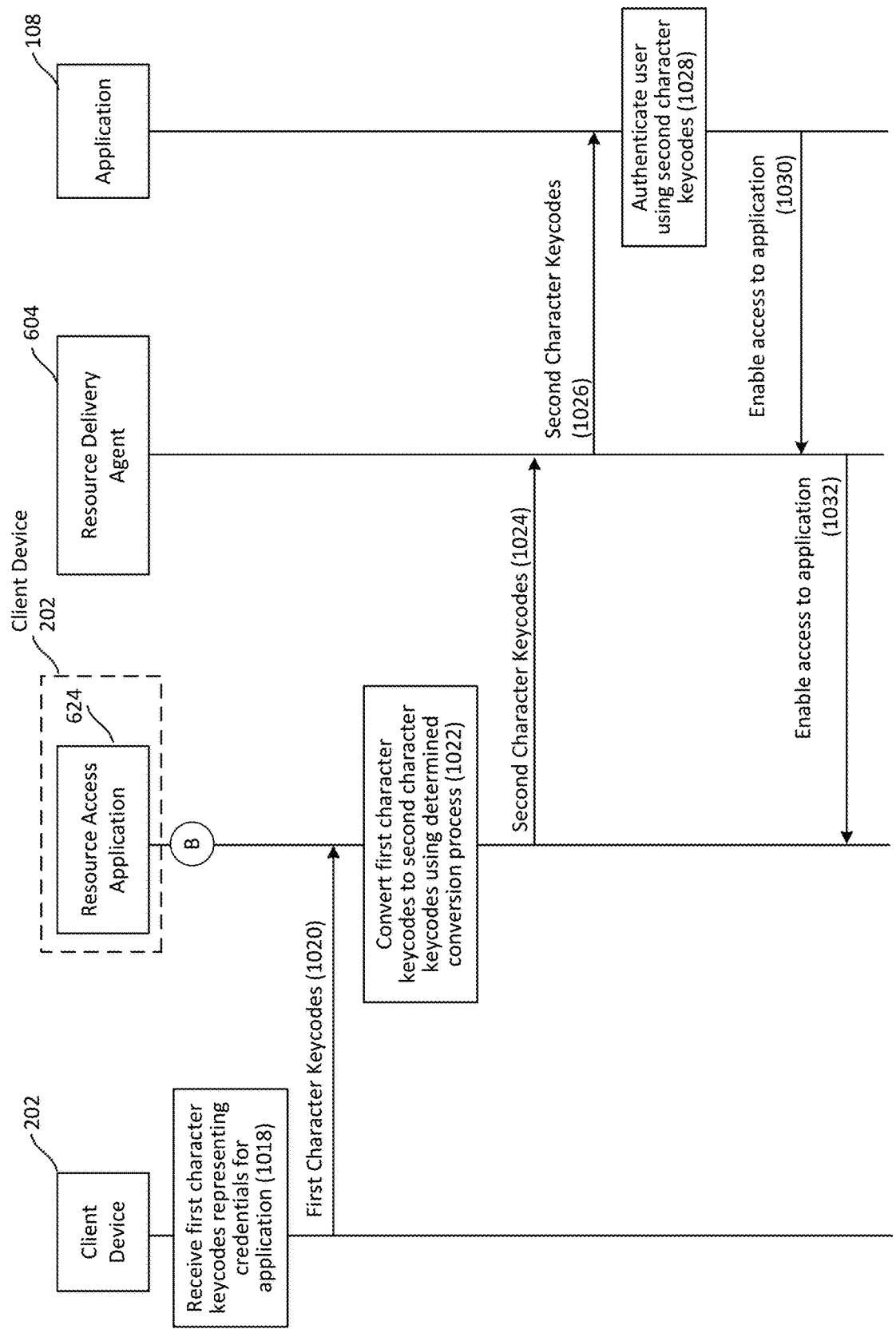

FIGS. 10A-10B illustrate an example signal flow diagram according to an example implementation of the user authentication system. In this example, the user 102 may access the application 108, which may be an application delivered by the shared computing resource 602 part of the resource delivery system 600 (described above in relation to FIGS. 6A-6E in Section F), and the conversion engine 810 may be part of the resource access application 624. In some implementations, for example the conversion engine 810 may be included within a high-definition experience (HDX) Library of the resource access application 624, which, as described in Section F, may be an Independent Computing Architecture (ICA) client developed by Citrix Systems, Inc.

Referring to FIG. 10A, the client device 202 may receive (1002) input(s) to authenticate the user 102 for remote access. Such input(s) may be provided (1004) to the resource access application 624 at the client device 202. In some implementations, the resource access application 624 may be installed on the client device 202. In other implementations, the resource access application 624 may be accessed using a web-browser. The resource access application 624 may authenticate (1006) the user 102 for remote access using the input(s) received in step 1002. Such authentication may be performed as described above in Section F, and may, for example, include interactions between the resource access application 624 and the client access manager 610 (shown FIGS. 6A-6E). The resource access application 624 may enable (1008) access, by the user 102, to one or more conversion processes based on successful authentication for the resource delivery system 500.

After the user 102 has access to the resource delivery system 600, the client device 202 may receive (1010) a request to access or enable additional functionality of an application 108 (e.g., an application delivered by a shared computing resource 602). The client device 202 may provide (1012) the request to the resource access application 624, or that request may be provided by the user 102 within/via the resource access application 624. The resource access application 624 may determine (1014) a conversion process to be used. In some implementations, the resource access application 624 may determine the conversion process based on the application 108 the user 102 wants to access. The conversion process may be determined using a user identifier for the user 102 associated with the resource access application 624. For example, one or more databases may store data associating the conversion process with the user identifier for the user 102 (and optionally associated with an application identifier for the application 108), and the conversion engine 810 may obtain data representing the conversion process from such database(s) following successful user authentication, as described above. As another example, the conversion process may be determined based on the type of credential to be converted (e.g., a conversion process may be different for a username than a conversion process for a password). In some implementations, such databases may be part of the resource delivery controller(s) 612 or another component shown in FIGS. 6A-6E.

Referring to FIG. 10B, the client device 202 may receive (1018) first character keycodes representing credentials for the application 108. The client device 202 may provide the first character keycodes to the resource access application 624, or the first character keycodes may be inputted by the user 102 within/via the resource access application 624. The resource access application 624 may convert (1022) the first character keycodes to second character keycodes using the determined conversion process. The resource access application 624 may include the conversion engine 810, and may perform the functionality described herein.

The resource access application 624 may provide (1024) to the resource delivery agent 602, which in turn may provide (1026) the second character keycodes to the application 108, using one or more components shown in FIGS. 6A-6E as described above in Section F. The application 108 may authenticate (1028) the user 102 using the second character keycodes. Based on successful authentication, the user 102 may be provided with access to the delivered application 108, or the application 108 may provide (1030) an indication to the resource delivery agent 602 to enable access to the application 108. The resource delivery agent 602 may enable (1032) access to the application 108 at the client device 202 via the resource access application 624 using one or more components shown in FIGS. 6A-6E. For example, the resource delivery controller(s) 612 may enable access to the application 108 as described above in Section F.

Figure 11A:
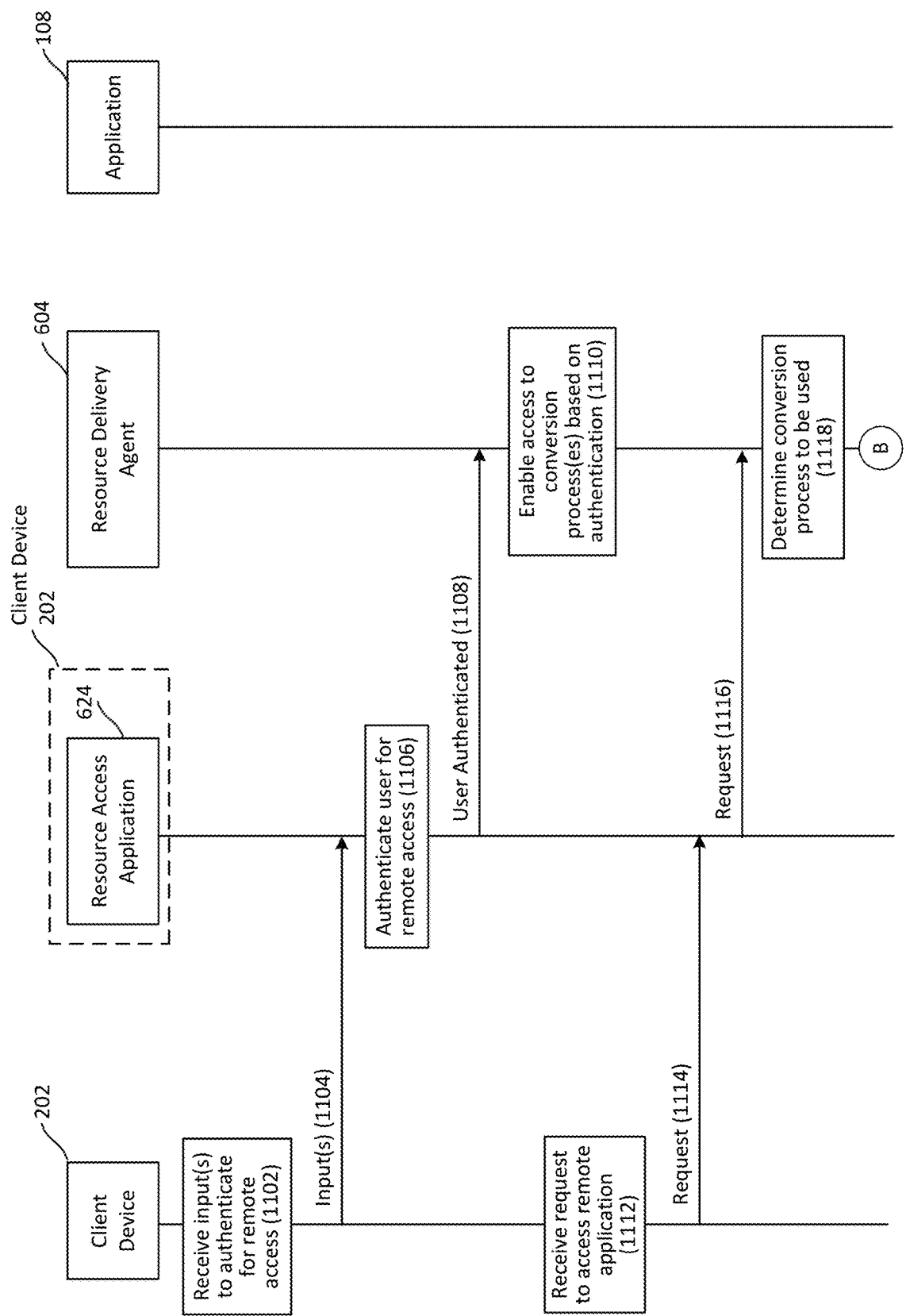
FIGS. 11A and 11B show an example signal diagram according to another example implementation of the system shown in FIGS. 8A and 8B.
Figure 11B:
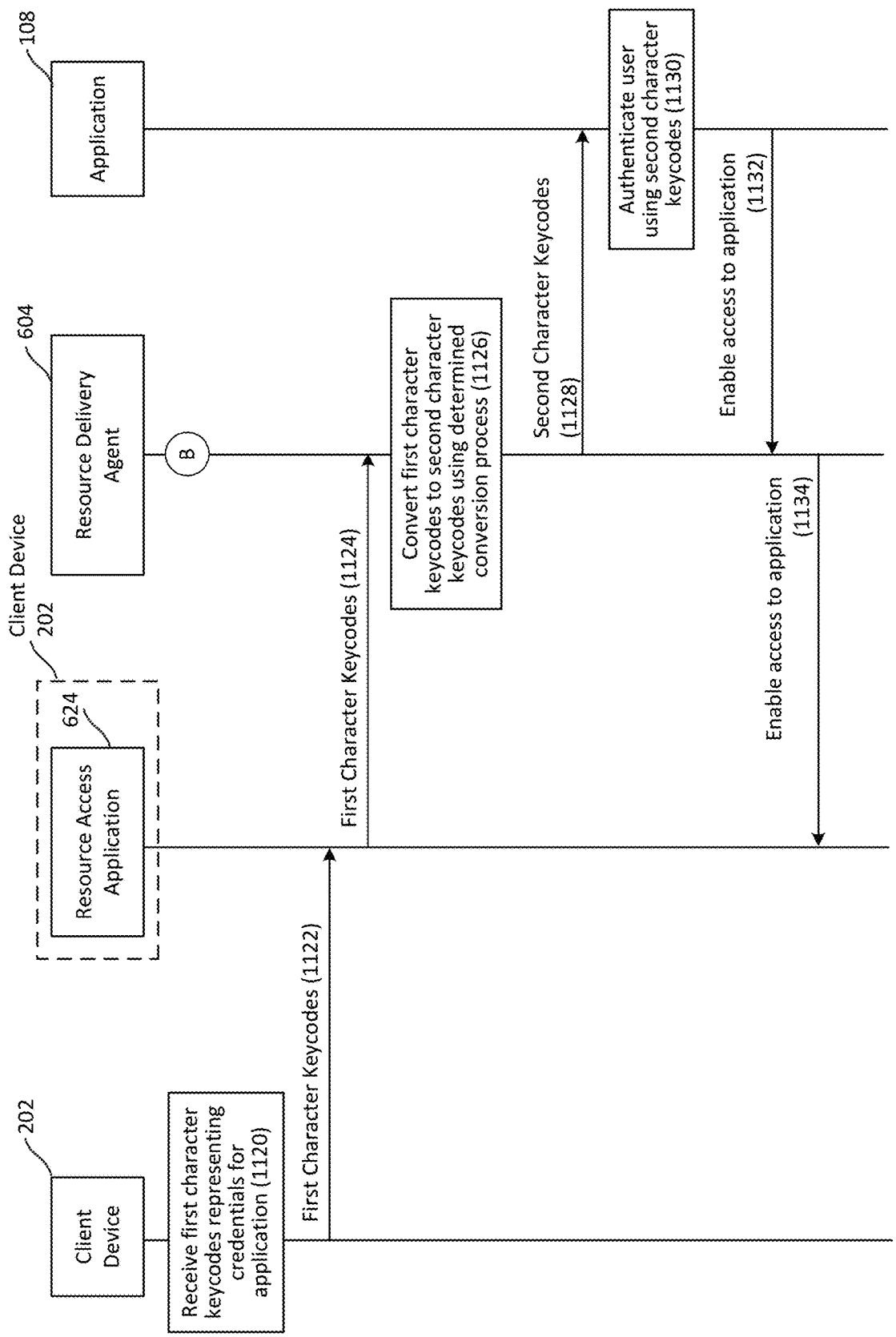

FIGS. 11A-11B illustrate another example signal flow diagram according to another example implementation of the user authentication system. In this example, the user 102 may access or enable functionality of the application 108 provided by the shared computing resource 602 part of the resource delivery system 600 (described above in relation to FIGS. 6A-6E in Section F), and the conversion engine 810 may be part of the resource delivery agent 604.

Referring to FIG. 11A, the client device 202 may receive (1102) input(s) to authenticate the user 102 for remote access. Such input(s) may be provided (1104) to the resource access application 624 at the client device 202. The resource access application 624 may authenticate (1106) the user 102 for remote access using the input(s) received in step 1102, as described above in Section F. The resource access application 624 may provide (1108) an indication of the user being authenticated to the resource delivery agent 604. The resource delivery agent 604 may enable (1110) access, by the user 102, to one or more conversion processes based on successful authentication for the resource delivery system 600.

The client device 202 may receive (1112) a request to access an application 108 provided by the shared computing resource 602. The client device may provide (1114) the request to the resource access application 624, or that request may be provided by the user 102 within/via the resource access application 624. The resource access application 624 may provide (1116) the request to access the application 108 to the resource delivery agent 604. The resource delivery agent 604 may determine (1118) a conversion process to be used. In some implementations, the resource delivery agent 604 may determine the conversion process based on the application 108 the user 102 wants to access. The conversion process may be determined using a user identifier for the user 102 associated with the resource access application 624. For example, one or more databases may store data associating the conversion process with the user identifier for the user 102 (and optionally associated with an application identifier for the application 108), and the conversion engine 810 may obtain data representing the conversion process from such database(s) following successful user authentication, as described above.

Referring to FIG. 11B, the client device 202 may receive (1120) first character keycodes representing credentials for the application 108. The client device 202 may provide the first character keycodes to the resource access application 624, or the first character keycodes may be inputted by the user 102 within/via the resource access application 624. The resource access application 624 may provide (1124) the first character keycodes to the resource delivery agent 604.

The resource delivery agent 604 may convert (1126) the first character keycodes to second character keycodes using the determined conversion process. The resource delivery agent 604 may include the conversion engine 810, and may perform the functionality described herein. The resource delivery agent 604 may provide (1128) the second character keycodes to the application 108, as described above in Section F. The application 108 may authenticate (1130) the user 102 using the second character keycodes. Based on successful authentication, the user 102 may be provided with access to the delivered application 108, or the application 108 may provide (1132) an indication to the resource delivery agent 604 to enable access to the application 108 for the user 102. In turn, the resource delivery agent 604 may enable (1134) access to the application 108 at the client device 202 via the resource access application 624, as described above in Section F.

Figure 12:
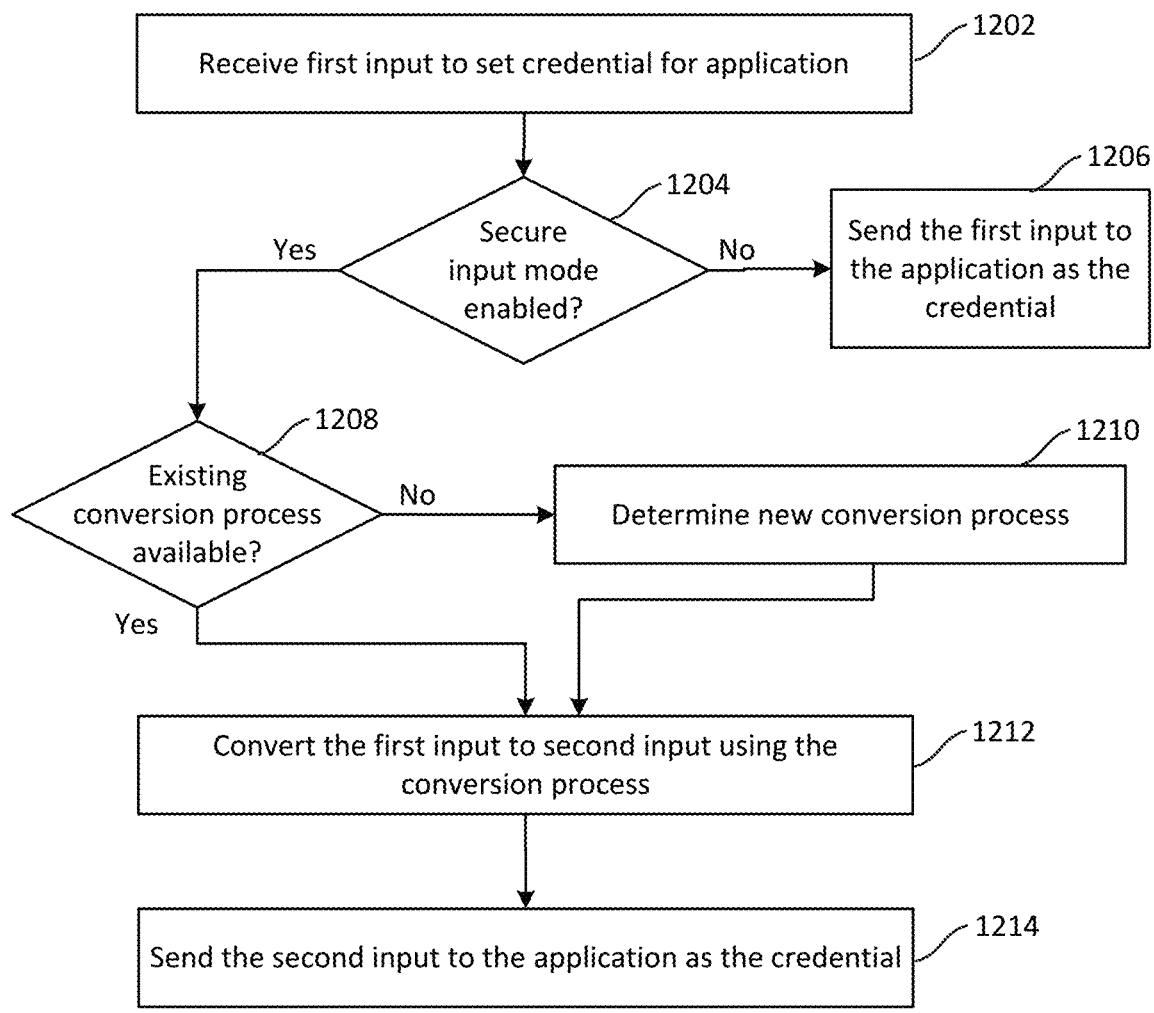
FIG. 12 is a flowchart illustrating an example process that may be performed by the system shown in FIGS. 8A and 8B.

In some implementations, the user 102 may have to enable a secure input mode to cause the computing system (s) 100 to convert inputted character keycodes/credentials to different character keycodes for authentication at the application 108. FIG. 12 is a flowchart illustrating an example process that may be performed by the user authentication system to set credentials (e.g., a password, a pin code, a passphrase, a pin, a username, etc.) for the application 108. One or more of the components of the computing system(s) 100 or the client device 202 described herein may perform one or more steps illustrated in FIG. 12 depending on system configuration.

At a step 1202, the client device 202 may receive a first input to set a credential (e.g., a password) for the application 108. The first input may be a plurality of character keywords that the user 102 wants to use as the credential for the application 108. In some implementations, the user 102 may provide the first input via the resource access application 522/624 at the client device 202. At a step 1104, the client device 202 (or the resource access application 522/624) may determine whether a secure input mode is enabled. The user 102 may enable the secure input mode by selecting a user interface element (e.g., a button, a drop down menu, an icon, etc.) at the client device 202, for example, displayed within the resource access application 522/624 or made available within user preferences/settings for the resource access application 522/624. If the secure input mode is not enabled, then at a step 1206, the client device 202 (or the resource access application 522/624) may send the first input to the application 108 as the credential.

If the secure input mode is enabled, then at a step 1208, the conversion engine 810 may determine whether an existing conversion process is available for the user 102. This determination may be based on stored data representing one or more conversion processes. As described herein, data representing a conversion process may be stored at the client device 202, the single sign-on service 520, the resource delivery controller 612 or another component described herein. In other cases, the conversion engine 810 may store data representing conversion processes associated with the user 102. In some implementations, the conversion process may be specific for the application 108 or the type of credential (username versus password) provided by the user 102.

If there are no conversion processes associated with the user 102 or there are no conversion process associated with the user 102 and the application 108 or the type of credential, then at a step 1210, the conversion engine 810 may determine a new conversion process. The conversion engine 810 may determine a new conversion process from existing conversion processes generally available at the conversion engine 810. For example, the conversion engine 810 may determine some random data (salt) to be used for the conversion process. The random data may be determined using a random data generator. As another example, the conversion engine 810 may determine an encoding technique, from existing encoding techniques available at the conversion engine 810, to be used for the conversion process. The conversion engine 810 may store data representing the new conversion process, and may associate the data with the user 102 (and optionally with the application 108). The data representing the new conversion process may enable the conversion engine 810 to generate the converted credential in the future when the user 102 wants to access the application 108, as described herein for example, in relation to the step 126 of the process 120 shown in FIG. 1, the step 920 shown in FIG. 9B, the step 1022 shown in FIG. 10B, and the step 1126 shown in FIG. 11B. After determining the new conversion process, the conversion engine 810 may perform a step 1212.

If there is an existing conversion process associated with the user 102 (and optionally with the application 108), then at the step 1212, the conversion engine 810 may convert the first input to a second input using the conversion process. The conversion engine 810 may perform this conversion as described above in connection with FIGS. 8A-8B.

At a step 1214, the client device 202 (or the resource access application 522/624) may send the second input to the application 108 as the credential for the user 102. Thus, the application 108 is configured to use the second input (the converted input) to authenticate the user 102. In other words, if the user 102 attempts to use the first input, without application of the conversion process, to authenticate the user at the application 108, then authentication may fail. Similarly, if another user attempts to use the first input, without application of the conversion process, to access the application 108 as the user 102, authentication may fail.

I. Example Implementations of Methods, Systems, and Computer-Readable Media in Accordance with the Present Disclosure The following paragraphs (M1) through (M29) describe examples of methods that may be implemented in accordance with the present disclosure.

(M1) A method may be performed that involves receiving, by a first computing system, a first plurality of character keycodes corresponding to characters input via a client device to authenticate a first user to a first application, determining, by the first computing system and based at least in part on the first user operating the client device, a first conversion process applicable to the first user, converting, by the first computing system and using the first conversion process, the first plurality of character keycodes into a second plurality of character keycodes different than the first plurality, and providing, by the first computing system, the second plurality of character keycodes to authenticate the first user to the first application, wherein the first application is configured to authenticate the first user using the second plurality of character keycodes instead of the first plurality, thus prohibiting a second user from using the first plurality of character keycodes to authenticate to the first application absent application of the first conversion process.

(M2) A method may be performed as described in paragraph (M1), and may further involve authenticating, by a second computing system, the first user based on one or more inputs provided by the first user prior to providing the first plurality of character keycodes, and based at least in part on the identity of the first user being authenticated based on the one or more inputs, determining that the first user is operating the client device.

(M3) A method may be performed as described in paragraph (M1) or paragraph (M2), wherein the first computing system is configured to provide access to one or more virtual applications including the first application.

(M4) A method may be performed as described in any of paragraphs (M1) through (M3), and may further involve determining, by the first computing system, the first conversion process based on a user identifier for the first user and an application identifier for the first application.

(M5) A method may be performed as described in any of paragraphs (M1) through (M4), and may further involve receiving, by the first computing system, a request to set credentials for the first application, receiving, by the first computing system, an input representing the first plurality of character keycodes representing credentials provided by the first user to be used for the first application, determining, by the first computing system, the first conversion process as a conversion process to be used for the first user and the first application, converting, by the first computing system and using the first conversion process, the first plurality of character keycodes to the second plurality, providing, by the first computing system to the first application, the second plurality of keycodes as the credentials to be used for authenticating the first user at the first application, and associating, by the first computing system, the first conversion process with the first user and the first application to enable use of the first conversion process to generate the second plurality of character keycodes for future authentication requests from the first user for the first application.

(M6) A method may be performed as described in any of paragraphs (M1) through (M5), and may further involve receiving, by the first computing system, the first plurality of character keycodes via another client device to authenticate the first user to the first application, determining, by the first computing system, that a second user is operating the other client device, determining, by the first computing system and based at least in part on the second user operating the other client device, a second conversion process associated with the second user, converting, by the first computing system and using the second conversion process, the first plurality of character keycodes into a third plurality of character keycodes different than the first plurality, providing, by the first computing system, the third plurality of character keycodes to the first application to authenticate the first user to the first application, and receiving, by the first computing system from the first application, an indication that authentication failed.

(M7) A method may be performed as described in any of paragraphs (M1) through (M6), and may further involve authenticating, by at least the first computing system, the first user for a resource access application, and based on authenticating the first user for the resource access application, receiving, by the first computing system, data representing the first conversion process.

(M8) A method may be performed as described in any of paragraphs (M1) through (M7), wherein data representing the first conversion process is received by the first computing system from the client device operated by the first user.

(M9) A method may be performed as described in any of paragraphs (M1) through (M8), wherein converting using the first conversion process comprises using additional data with the first plurality of character keycodes.

(M10) A method may be performed as described in any of paragraphs (M1) through (M9), wherein converting using the first conversion process comprises applying an encoding technique to the first plurality of character keycodes.

(M11) A method may be performed that involves a client device receiving a first plurality of character keycodes corresponding to characters to authenticate a first user to a first application, determining, based at least in part on the first user operating the client device, a first conversion process applicable to the first user, converting, using the first conversion process, the first plurality of character keycodes into a second plurality of character keycodes different than the first plurality, and providing the second plurality of character keycodes to authenticate the first user to the first application, wherein the first application is configured to authenticate the first user using the second plurality of character keycodes instead of the first plurality, thus prohibiting a second user from using the first plurality of character keycodes to authenticate to the first application absent application of the first conversion process.

(M12) A method may be performed as described in paragraph (M11), and may further involve authenticating, by a computing system, the first user based on one or more inputs provided by the first user prior to providing the first plurality of character keycodes, and based at least in part on the first user being authenticated based on the one or more inputs, determining that the first user is operating the client device.

(M13) A method may be performed as described in paragraph (M11) or paragraph (M12), wherein the client device is configured to provide access to one or more virtual applications including the first application.

(M14) A method may be performed as described in any of paragraphs (M11) through (M13), and may further involve the client device determining the first conversion process based on a user identifier for the first user and an application identifier for the first application.

(M15) A method may be performed as described in any of paragraphs (M11) through (M14), and may further involve the client device receiving a request to set credentials for the first application, receiving an input representing the first plurality of character keycodes representing credentials provided by the first user to be used for the first application, determining the first conversion process as a conversion process to be used for the first user and the first application, converting, using the first conversion process, the first plurality of character keycodes to the second plurality of character keycodes, providing, to the first application, the second plurality of character keycodes as the credentials to be used for authenticating the first user at the first application, and associating the first conversion process with the first user and the first application to enable use of the first conversion process to generate the second plurality of character keycodes for future authentication requests from the first user for the first application.

(M16) A method may be performed as described in any of paragraphs (M11) through (M15), and may further involve the client device receiving the first plurality of character keycodes to authenticate a user to the first application, determining, based at least in part on the second user operating the other client device, a second conversion process associated with the second user, converting, using the second conversion process, the first plurality of character keycodes into a third plurality of character keycodes different than the first plurality, providing the third plurality of character keycodes to the first application to authenticate the first user to the first application, and receiving, from the first application, an indication that authentication failed.

(M17) A method may be performed as described in any of paragraphs (M11) through (M16), and may further involve the client device authenticating the first user for a resource access application, and based on authenticating the first user for the resource access application, receiving data representing the first conversion process.

(M18) A method may be performed as described in any of paragraphs (M11) through (M17), wherein data representing the first conversion process is received by the client device from a first computing system.

(M19) A method may be performed as described in any of paragraphs (M11) through (M18), wherein converting using the first conversion process comprises using additional data with the first plurality of character keycodes.

(M20) A method may be performed as described in any of paragraphs (M11) through (M19), wherein converting using the first conversion process comprises applying an encoding technique to the first plurality of character keycodes.

(M21) A method may be performed that involves determining, by a first computing system, a first conversion process associated with a user, receiving, by the first computing system, first data representing a first input provided by the user to authenticate the user to a first application, converting, by the first computing system, the first data with use of the first conversion process to generate second data, and providing, by the first computing system, the second data to the first application to authenticate the user.

(M22) A method may be performed as described in paragraph (M21), and may further involve authenticating, by a second computing system, the user based on third data representing a second input provided by the user, and based at least in part on the user being authenticated based on the third data, sending, from the second computing system to the first computing system, data representing the first conversion process.

(M23) A method may be performed as described in paragraph (M21) or paragraph (M22), wherein the second computing system configured to provide access to one or more virtual applications including the first application.

(M24) A method may be performed as described in any of paragraphs (M21) through (M23), and may further involve determining the first conversion process based on a user identifier for the user and application identifier for the first application.

(M25) A method may be performed as described in any of paragraphs (M21) through (M24), wherein converting the first data comprises executing an encoding technique using additional data and the first data.

(M26) A method may be performed as described in any of paragraphs (M21) through (M25), wherein converting the first data comprises executing a hash function using the first data and additional data.

(M27) A method may be performed as described in any of paragraphs (M21) through (M26), may further involve prior to determining the first data, receiving, by the first computing system, a request to set a password for the first application, receiving, by the first computing system, third data representing the first input provided by the user to set the password for the first application, converting, by the first computing system, the third data with use of the first conversion process to generate an encoded password, providing, by the first computing system to the first application, the encoded password to be used for authenticating the user, and associating, by the first computing system, the first conversion process with the user and the first application to enable use of the first conversion process to generate the encoded password for future authentication requests from the user for the first application.

(M28) A method may be performed as described in any of paragraphs (M21) through (M27), may further involve receiving, by the first computing system, third data representing the first input provided by a different user to authenticate the user to the first application, determining, by the first computing system, a second conversion process associated with the different user, converting, by the first computing system, the third data with use of the second conversion process to generate fourth data, providing, by the first computing system, the fourth data to the first application to authenticate the user, and receiving, by the first computing system and from the first application, an indication that authentication failed with respect to the user.

(M29) A method may be performed as described in paragraph (M28), and may further involve authenticating the different user based on a second input provided by the different user, and based at least in part on the different user being authenticated, determining the fifth data associated with the different user.

The following paragraphs (S1) through (S29) describe examples of systems and devices that may be implemented in accordance with the present disclosure.

(S1) A system may comprise at least a first computing system that may comprise at least one processor and at least one computer-readable medium encoded with instructions which, when executed by the at least one processor, cause the first computing system to receive a first plurality of character keycodes corresponding to characters input via a client device to authenticate a first user to a first application, determine, based at least in part on the first user operating the client device, a first conversion process applicable to the first user, convert, using the first conversion process, the first plurality of character keycodes into a second plurality of character keycodes different than the first plurality, and provide the second plurality of character keycodes to authenticate the first user to the first application, wherein the first application is configured to authenticate the first user using the second plurality of character keycodes instead of the first plurality, thus prohibiting a second user from using the first plurality of character keycodes to authenticate to the first application absent application of the first conversion process.

(S2) A system may be configured as described in paragraph (S1), and may further comprise a second computing system that may comprise at least one other processor, and at least one other computer-readable medium encoded with instructions which, when executed by the at least one other processor, further cause the second computing system to authenticate the first user based on one or more inputs provided by the first user prior to providing the first plurality of character keycodes, and based at least in part on the identity of the first user being authenticated based on the one or more inputs, determine that the first user is operating the client device.

(S3) A system may be configured as described in paragraph (S1) or paragraph (S2), wherein the first computing system is configured to provide access to one or more virtual applications including the first application.

(S4) A system may be configured as described in any of paragraphs (S1) through (S3), wherein the at least one computer-readable medium may be further encoded with additional instructions which, when executed by the at least one processor, further cause the first computing system to determine the first conversion process based on a user identifier for the first user and an application identifier for the first application.

(S5) A system may be configured as described in any of paragraphs (S1) through (S4), wherein the at least one computer-readable medium may be further encoded with additional instructions which, when executed by the at least one processor, further cause the first computing system to receive a request to set credentials for the first application, receive the first plurality of character keycodes representing credentials provided by the first user for the first application, determine the first conversion process as a conversion process to be used for the first user and the first application, convert, using the first conversion process, the first plurality of character keycodes to the second plurality, provide, to the first application, the second plurality of keycodes as the credentials to be used for authenticating the first user at the first application, and associate the first conversion process with the first user and the first application to enable use of the first conversion process to generate the second plurality of character keycodes for future authentication requests from the first user for the first application.

(S6) A system may be configured as described in any of paragraphs (S1) through (S5), wherein the at least one computer-readable medium may be further encoded with additional instructions which, when executed by the at least one processor, further cause the first computing system to receive the first plurality of character keycodes via another client device to authenticate the first user to the first application, determine that a second user is operating the other client device, determine, based at least in part on the second user operating the other client device, a second conversion process associated with the second user, convert, using the second conversion process, the first plurality of character keycodes into a third plurality of character keycodes different than the first plurality, provide the third plurality of character keycodes to the first application to authenticate the first user to the first application, and receive, from the first application, an indication that authentication failed.

(S7) A system may be configured as described in any of paragraphs (S1) through (S6), wherein the at least one computer-readable medium may be further encoded with additional instructions which, when executed by the at least one processor, further cause the first computing system to authenticate the first user for a resource access application, and based on authenticating the first user for the resource access application, receive data representing the first conversion process.

(S8) A system may be configured as described in any of paragraphs (S1) through (S7), wherein data representing the first conversion process is received by the first computing system from the client device operated by the first user.

(S9) A system may be configured as described in any of paragraphs (S1) through (S8), wherein converting using the first conversion process comprises using additional data with the first plurality of character keycodes.

(S10) A system may be configured as described in any of paragraphs (S1) through (S9), wherein converting using the first conversion process comprises applying an encoding technique to the first plurality of character keycodes.

(S11) A computing system may comprise at least one processor and at least one computer-readable medium encoded with instructions which, when executed by the at least one processor, cause the computing system to receive a first plurality of character keycodes corresponding to characters to authenticate a first user to a first application, determine, based at least in part on the first user operating the client device, a first conversion process applicable to the first user, convert, using the first conversion process, the first plurality of character keycodes into a second plurality of character keycodes different than the first plurality, and provide the second plurality of character keycodes to authenticate the first user to the first application, wherein the first application is configured to authenticate the first user using the second plurality of character keycodes instead of the first plurality, thus prohibiting a second user from using the first plurality of character keycodes to authenticate to the first application absent application of the first conversion process.

(S12) A computing system may be configured as described in paragraph (S11), wherein the at least one computer-readable medium may be further encoded with additional instructions which, when executed by the at least one processor, further cause the computing system to authenticating, by another computing system, the first user based on one or more inputs provided by the first user prior to providing the first plurality of character keycodes, and based at least in part on the first user being authenticated based on the one or more inputs, determining that the first user is operating the client device.

(S13) A computing system may be configured as described in paragraph (S11) or paragraph (S12), wherein the client device is configured to provide access to one or more virtual applications including the first application.

(S14) A computing system may be configured as described in any of paragraphs (S11) through (S13), wherein the at least one computer-readable medium may be further encoded with additional instructions which, when executed by the at least one processor, further cause the computing system to determine the first conversion process based on a user identifier for the first user and an application identifier for the first application.

(S15) A computing system may be configured as described in any of paragraphs (S11) through (S14), wherein the at least one computer-readable medium may be further encoded with additional instructions which, when executed by the at least one processor, further cause the computing system to receive a request to set credentials for the first application, receive an input representing the first plurality of character keycodes representing credentials provided by the first user to be used for the first application, determine the first conversion process as a conversion process to be used for the first user and the first application, convert, using the first conversion process, the first plurality of character keycodes to the second plurality of character keycodes, provide, to the first application, the second plurality of character keycodes as the credentials to be used for authenticating the first user at the first application, and associate the first conversion process with the first user and the first application to enable use of the first conversion process to generate the second plurality of character keycodes for future authentication requests from the first user for the first application.

(S16) A computing system may be configured as described in any of paragraphs (S11) through (S15), wherein the at least one computer-readable medium may be further encoded with additional instructions which, when executed by the at least one processor, further cause the computing system to receive the first plurality of character keycodes to authenticate a user to the first application, determine, based at least in part on the second user operating the other client device, a second conversion process associated with the second user, convert, using the second conversion process, the first plurality of character keycodes into a third plurality of character keycodes different than the first plurality, provide the third plurality of character keycodes to the first application to authenticate the first user to the first application, and receiving, from the first application, an indication that authentication failed.

(S17) A computing system may be configured as described in any of paragraphs (S11) through (S16), wherein the at least one computer-readable medium may be further encoded with additional instructions which, when executed by the at least one processor, further cause the computing system to authenticating the first user for a resource access application, and based on authenticating the first user for the resource access application, receiving data representing the first conversion process.

(S18) A computing system may be configured as described in any of paragraphs (S11) through (S17), wherein data representing the first conversion process is received by the client device from a first computing system.

(S19) A computing system may be configured as described in any of paragraphs (S11) through (S18), wherein the at least one computer-readable medium may be further encoded with additional instructions which, when executed by the at least one processor, further cause the computing system to use additional data with the first plurality of character keycodes to convert into the second plurality of character keycodes.

(S20) A computing system may be configured as described in any of paragraphs (S11) through (S19), wherein the at least one computer-readable medium may be further encoded with additional instructions which, when executed by the at least one processor, further cause the computing system to apply an encoding technique to the first plurality of character keycodes.

(S21) A computing system may comprise at least one processor and at least one computer-readable medium encoded with instructions which, when executed by the at least one processor, cause the computing system to determine a first conversion process associated with a user, receive first data representing a first input provided by the user to authenticate the user to a first application, convert the first data with use of the first conversion process to generate second data, and provide the second data to the first application to authenticate the user.

(S22) A computing system may be configured as described in paragraph (S21), wherein the at least one computer-readable medium may be further encoded with additional instructions which, when executed by the at least one processor, further cause the computing system to authenticating, by another computing system, the user based on third data representing a second input provided by the user, and based at least in part on the user being authenticated based on the third data, sending, from the another computing system to the computing system, data representing the first conversion process.

(S23) A computing system may be configured as described in paragraph (S21) or paragraph (S22), wherein the another computing system is configured to provide access to one or more virtual applications including the first application.

(S24) A computing system may be configured as described in any of paragraphs (S21) through (S23), wherein the at least one computer-readable medium may be further encoded with additional instructions which, when executed by the at least one processor, further cause the computing system to determine the first conversion process based on a user identifier for the user and application identifier for the first application.

(S25) A computing system may be configured as described in any of paragraphs (S21) through (S24), wherein the at least one computer-readable medium may be further encoded with additional instructions which, when executed by the at least one processor, further cause the computing system to execute an encoding technique using additional data and the first data.

(S26) A computing system may be configured as described in any of paragraphs (S21) through (S25), wherein the at least one computer-readable medium may be further encoded with additional instructions which, when executed by the at least one processor, further cause the computing system to execute a hash function using the first data and additional data.

(S27) A computing system may be configured as described in any of paragraphs (S21) through (S26), wherein the at least one computer-readable medium may be further encoded with additional instructions which, when executed by the at least one processor, further cause the computing system to determine the first data, receive a request to set a password for the first application, receive third data representing the first input provided by the user to set the password for the first application, convert the third data with use of the first conversion process to generate an encoded password, provide, to the first application, the encoded password to be used for authenticating the user, and associate the first conversion process with the user and the first application to enable use of the first conversion process to generate the encoded password for future authentication requests from the user for the first application.

(S28) A computing system may be configured as described in any of paragraphs (S21) through (S27), wherein the at least one computer-readable medium may be further encoded with additional instructions which, when executed by the at least one processor, further cause the computing system to receive third data representing the first input provided by a different user to authenticate the user to the first application, determine a second conversion process associated with the different user, convert the third data with use of the second conversion process to generate fourth data, provide the fourth data to the first application to authenticate the user, and receive, from the first application, an indication that authentication failed with respect to the user.

(S29) A computing system may be configured as described in paragraph (S28), wherein the at least one computer-readable medium may be further encoded with additional instructions which, when executed by the at least one processor, further cause the computing system to authenticate the identity of the different user based on a second input provided by the different user, and based at least in part on the identity of the different user, determining the fifth data associated with the different user.

The following paragraphs (CRM1) through (CRM29) describe examples of computer-readable media that may be implemented in accordance with the present disclosure.

(CRM1) At least one non-transitory computer-readable medium may be encoded with instructions which, when executed by at least one processor of a computing system, may cause the computing system to receive a first plurality of character keycodes corresponding to characters input via a client device to authenticate a first user to a first application, determine, based at least in part on the first user operating the client device, a first conversion process applicable to the first user, convert, using the first conversion process, the first plurality of character keycodes into a second plurality of character keycodes different than the first plurality, and provide the second plurality of character keycodes to authenticate the first user to the first application, wherein the first application is configured to authenticate the first user using the second plurality of character keycodes instead of the first plurality of character keycodes, thus prohibiting a second user from using the first plurality of keycodes to authenticate to the first application absent application of the first conversion process.

(CRM2) At least one non-transitory computer-readable medium may be configured as described in paragraph (CRM1), and may be further encoded with additional instructions which, when executed by the at least one processor, further cause the computing system to authenticate the first user based on one or more inputs provided by the first user prior to providing the first plurality of character keycodes, and based at least in part on the first user being authenticated based on the one or more inputs, determine that the first user is operating the client device.

(CRM3) At least one non-transitory computer-readable medium may be configured as described in paragraph (CRM1) or paragraph (CRM2), wherein the first computing system is configured to provide access to one or more virtual applications including the first application.

(CRM4) At least one non-transitory computer-readable medium may be configured as described in any of paragraphs (CRM1) through (CRM3), and may be further encoded with additional instructions which, when executed by the at least one processor, further cause the computing system to determine the first conversion process based on a user identifier for the first user and an application identifier for the first application.

(CRM5) At least one non-transitory computer-readable medium may be configured as described in any of paragraphs (CRM1) through (CRM4), and may be further encoded with additional instructions which, when executed by the at least one processor, further cause the computing system to receive a request to set credentials for the first application, receive the first plurality of character keycodes representing credentials provided by the first user for the first application, determine the first conversion process as a conversion process to be used for the first user and the first application, convert, using the first conversion process, the first plurality of character keycodes to the second plurality, provide, to the first application, the second plurality of keycodes as the credentials to be used for authenticating the first user at the first application, and associate the first conversion process with the first user and the first application to enable use of the first conversion process to generate the second plurality of character keycodes for future authentication requests from the first user for the first application.

(CRM6) At least one non-transitory computer-readable medium may be configured as described in any of paragraphs (CRM1) through (CRM5), and may be further encoded with additional instructions which, when executed by the at least one processor, further cause the computing system to receive the first plurality of character keycodes via another client device to authenticate the first user to the first application, determine that a second user is operating the other client device, determine, based at least in part on the second user operating the other client device, a second conversion process associated with the second user, convert, using the second conversion process, the first plurality of character keycodes into a third plurality of character keycodes different than the first plurality, provide the third plurality of character keycodes to the first application to authenticate the first user to the first application, and receive, from the first application, an indication that authentication failed.

(CRM7) At least one non-transitory computer-readable medium may be configured as described in any of paragraphs (CRM1) through (CRM6), and may be further encoded with additional instructions which, when executed by the at least one processor, further cause the computing system to authenticate the first user for a resource access application, and based on authenticating the first user for the resource access application, receive data representing the first conversion process.

(CRM8) At least one non-transitory computer-readable medium may be configured as described in any of paragraphs (CRM1) through (CRM7), wherein data representing the first conversion process is received by the first computing system from the client device operated by the first user.

(CRM9) At least one non-transitory computer-readable medium may be configured as described in any of paragraphs through (CRM1) through (CRM8), wherein converting using the first conversion process comprises using additional data with the first plurality of character keycodes.

(CRM10) At least one non-transitory computer-readable medium may be configured as described in any of paragraphs (CRM1) through (CRM9), wherein converting using the first conversion process comprises applying an encoding technique to the first plurality of character keycodes.

(CRM11) At least one non-transitory computer-readable medium may be encoded with instructions which, when executed by at least one processor of a computing system, may cause the computing system to receive a first plurality of character keycodes corresponding to characters to authenticate a first user to a first application, determine, based at least in part on the first user operating the client device, a first conversion process applicable to the first user, convert, using the first conversion process, the first plurality of character keycodes into a second plurality of character keycodes different than the first plurality, and provide the second plurality of character keycodes to authenticate the first user to the first application, wherein the first application is configured to authenticate the identity of the first user using the second plurality of character keycodes instead of the first plurality of character keycodes, thus prohibiting a second user from using the first plurality of keycodes to authenticate to the first application absent application of the first conversion process.

(CRM12) At least one non-transitory computer-readable medium may be configured as described in paragraph (CRM11), and may be further encoded with additional instructions which, when executed by the at least one processor, further cause the computing system to authenticating, by another computing system, the first user based on one or more inputs provided by the first user prior to providing the first plurality of character keycodes, and based at least in part on the first user being authenticated based on the one or more inputs, determining that the first user is operating the client device.

(CRM13) At least one non-transitory computer-readable medium may be configured as described in paragraph (CRM11) or paragraph (CRM12), wherein the client device is configured to provide access to one or more virtual applications including the first application.

(CRM14) At least one non-transitory computer-readable medium may be configured as described in any of paragraphs (CRM11) through (CRM13), and may be further encoded with additional instructions which, when executed by the at least one processor, further cause the computing system to determine the first conversion process based on a user identifier for the first user and an application identifier for the first application.

(CRM15) At least one non-transitory computer-readable medium may be configured as described in any of paragraphs (CRM11) through (CRM14), and may be further encoded with additional instructions which, when executed by the at least one processor, further cause the computing system to receive a request to set credentials for the first application, receive an input representing the first plurality of character keycodes representing credentials provided by the first user to be used for the first application, determine the first conversion process as a conversion process to be used for the first user and the first application, convert, using the first conversion process, the first plurality of character keycodes to the second plurality of character keycodes, provide, to the first application, the second plurality of character keycodes as the credentials to be used for authenticating the first user at the first application, and associate the first conversion process with the first user and the first application to enable use of the first conversion process to generate the second plurality of character keycodes for future authentication requests from the first user for the first application.

(CRM16) At least one non-transitory computer-readable medium may be configured as described in any of paragraphs (CRM11) through (CRM15), and may be further encoded with additional instructions which, when executed by the at least one processor, further cause the computing system to receive the first plurality of character keycodes to authenticate a user to the first application, determine, based at least in part on the second user operating the other client device, a second conversion process associated with the second user, convert, using the second conversion process, the first plurality of character keycodes into a third plurality of character keycodes different than the first plurality, provide the third plurality of character keycodes to the first application to authenticate the first user to the first application, and receiving, from the first application, an indication that authentication failed.

(CRM17) At least one non-transitory computer-readable medium may be configured as described in any of paragraphs (CRM11) through (CRM16), and may be further encoded with additional instructions which, when executed by the at least one processor, further cause the computing system to authenticating the first user for a resource access application, and based on authenticating the first user for the resource access application, receiving data representing the first conversion process.

(CRM18) At least one non-transitory computer-readable medium may be configured as described in any of paragraphs (CRM11) through (CRM17), wherein data representing the first conversion process is received by the client device from a first computing system.

(CRM19) At least one non-transitory computer-readable medium may be configured as described in any of paragraphs (CRM11) through (CRM18), and may be further encoded with additional instructions which, when executed by the at least one processor, further cause the computing system to use additional data with the first plurality of character keycodes to convert into the second plurality of character keycodes.

(CRM20) At least one non-transitory computer-readable medium may be configured as described in any of paragraphs (CRM11) through (CRM19), and may be further encoded with additional instructions which, when executed by the at least one processor, further cause the computing system to apply an encoding technique to the first plurality of character keycodes.

(CRM21) At least one non-transitory computer-readable medium may be encoded with instructions which, when executed by at least one processor of a computing system, may cause the computing system to determine a first conversion process associated with a user, receive first data representing a first input provided by the user to authenticate the user to a first application, convert the first data with use of the first conversion process to generate second data, and provide the second data to the first application to authenticate the user.

(CRM22) At least one non-transitory computer-readable medium may be configured as described in paragraph (CRM21), and may be further encoded with additional instructions which, when executed by the at least one processor, further cause the computing system to authenticating, by another computing system, the user based on third data representing a second input provided by the user, and based at least in part on the user being authenticated based on the third data, sending, from the another computing system to the computing system, data representing the first conversion process.

(CRM23) At least one non-transitory computer-readable medium may be configured as described in paragraph (CRM21) or paragraph (CRM22), wherein the another computing system is configured to provide access to one or more virtual applications including the first application.

(CRM24) At least one non-transitory computer-readable medium may be configured as described in any of paragraphs (CRM21) through (CRM23), and may be further encoded with additional instructions which, when executed by the at least one processor, further cause the computing system to determine the first conversion process based on a user identifier for the user and application identifier for the first application.

(CRM25) At least one non-transitory computer-readable medium may be configured as described in any of paragraphs (CRM21) through (CRM24), and may be further encoded with additional instructions which, when executed by the at least one processor, further cause the computing system to execute an encoding technique using additional data and the first data.

(CRM26) At least one non-transitory computer-readable medium may be configured as described in any of paragraphs (CRM21) through (CRM25), and may be further encoded with additional instructions which, when executed by the at least one processor, further cause the computing system to execute a hash function using the first data and additional data.

(CRM27) At least one non-transitory computer-readable medium may be configured as described in any of paragraphs (CRM21) through (CRM26), and may be further encoded with additional instructions which, when executed by the at least one processor, further cause the computing system to determine the first data, receive a request to set a password for the first application, receive third data representing the first input provided by the user to set the password for the first application, convert the third data with use of the first conversion process to generate an encoded password, provide, to the first application, the encoded password to be used for authenticating the user, and associate the first conversion process with the user and the first application to enable use of the first conversion process to generate the encoded password for future authentication requests from the user for the first application.

(CRM28) At least one non-transitory computer-readable medium may be configured as described in any of paragraphs (CRM21) through (CRM27), and may be further encoded with additional instructions which, when executed by the at least one processor, further cause the computing system to receive third data representing the first input provided by a different user to authenticate the user to the first application, determine a second conversion process associated with the different user, convert the third data with use of the second conversion process to generate fourth data, provide the fourth data to the first application to authenticate the user, and receive, from the first application, an indication that authentication failed with respect to the user.

(CRM29) At least one non-transitory computer-readable medium may be configured as described in paragraph (CRM28), and may be further encoded with additional instructions which, when executed by the at least one processor, further cause the computing system to authenticate the identity of the different user based on a second input provided by the different user, and based at least in part on the identity of the different user, determining the fifth data associated with the different user.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
 receiving, by a first computing system, a first plurality of character keycodes corresponding to characters input via a client device to authenticate a first user to a first application;
 determining, by the first computing system and based at least in part on the first user operating the client device, a first conversion process applicable to the first user;
 converting, by the first computing system and using the first conversion process, the first plurality of character keycodes into a second plurality of character keycodes different than the first plurality;
 providing, by the first computing system, the second plurality of character keycodes to authenticate the first user to the first application, wherein the first application is configured to authenticate the first user using the second plurality of character keycodes instead of the first plurality, thus prohibiting a second user from using the first plurality of character keycodes to authenticate to the first application absent application of the first conversion process;
 receiving, by the first computing system, the first plurality of character keycodes via another client device to authenticate the first user to the first application;
 determining, by the first computing system, that the second user is operating the other client device;
 determining, by the first computing system and based at least in part on the second user operating the other client device, a second conversion process associated with the second user;
 converting, by the first computing system and using the second conversion process, the first plurality of character keycodes into a third plurality of character keycodes different than the first plurality;
 providing, by the first computing system, the third plurality of character keycodes to the first application to authenticate the first user to the first application; and
 receiving, by the first computing system from the first application, an indication that authentication failed.

2. The method of claim 1, further comprising:
 authenticating, by a second computing system, the first user based on one or more inputs provided by the first user prior to providing the first plurality of character keycodes; and
 based at least in part on the first user being authenticated based on the one or more inputs, determining that the first user is operating the client device.

3. The method of claim 1, wherein the first computing system is configured to provide access to one or more virtual applications including the first application.

4. The method of claim 1, further comprising:
 determining, by the first computing system, the first conversion process based on a user identifier for the first user and an application identifier for the first application.

5. The method of claim 1, further comprising:
 receiving, by the first computing system, a request to set credentials for the first application;
 receiving, by the first computing system, an input representing the first plurality of character keycodes representing credentials provided by the first user to be used for the first application;
 determining, by the first computing system, the first conversion process as a conversion process to be used for the first user and the first application;
 converting, by the first computing system and using the first conversion process, the first plurality of character keycodes to the second plurality;
 providing, by the first computing system to the first application, the second plurality of keycodes as the credentials to be used for authenticating the first user at the first application; and
 associating, by the first computing system, the first conversion process with the first user and the first application to enable use of the first conversion process to generate the second plurality of character keycodes for future authentication requests from the first user for the first application.

6. The method of claim 1, further comprising:
 authenticating, by at least the first computing system, the first user for a resource access application; and
 based on authenticating the first user for the resource access application, receiving, by the first computing system, data representing the first conversion process.

7. The method of claim 1, wherein data representing the first conversion process is received by the first computing system from the client device operated by the first user.

8. The method of claim 1, wherein converting using the first conversion process comprises using additional data with the first plurality of character keycodes.

9. The method of claim 1, wherein converting using the first conversion process comprises applying an encoding technique to the first plurality of character keycodes.

10. A system comprising at least a first computing system, the first computing system comprising:
  at least one processor; and
  at least one computer-readable medium encoded with instructions which, when executed by the at least one processor, cause the first computing system to:
    receive a first plurality of character keycodes corresponding to characters input via a client device to authenticate a first user to a first application;
    determine, based at least in part on the first user operating the client device, a first conversion process applicable to the first user;
    convert, using the first conversion process, the first plurality of character keycodes into a second plurality of character keycodes different than the first plurality;
    provide the second plurality of character keycodes to authenticate the first user to the first application, wherein the first application is configured to authenticate the first user using the second plurality of character keycodes instead of the first plurality, thus prohibiting a second user from using the first plurality of character keycodes to authenticate to the first application absent application of the first conversion process;
    receive the first plurality of character keycodes via another client device to authenticate the first user to the first application;
    determine that a second user is operating the other client device;
    determine, based at least in part on the second user operating the other client device, a second conversion process associated with the second user;
    convert, using the second conversion process, the first plurality of character keycodes into a third plurality of character keycodes different than the first plurality;
    provide the third plurality of character keycodes to the first application to authenticate the first user to the first application; and
    receive, from the first application, an indication that authentication failed.

11. The system of claim 10 further comprising a second computing system, the second computing system comprising:
  at least one other processor; and
  at least one other computer-read able medium encoded with instructions which, when executed by the at least one other processor, cause the second computing system to:
    authenticate the first user based on one or more inputs provided by the first user prior to providing the first plurality of character keycodes; and
    based at least in part on the first user being authenticated based on the one or more inputs, determine that the first user is operating the client device.

12. The system of claim 10, wherein the first computing system is configured to provide access to one or more virtual applications including the first application.

13. The system of claim 10, wherein the at least one computer-readable medium is encoded with instructions which, when executed by the at least one processor, cause the first computing system to:
  determine the first conversion process based on a user identifier for the first user and an application identifier for the first application.

14. The system of claim 10, wherein the at least one computer-readable medium is further encoded with additional instructions which, when executed by the at least one processor, cause the first computing system to:
  receive a request to set credentials for the first application;
  receive the first plurality of character keycodes representing credentials provided by the first user for the first application;
  determine the first conversion process as a conversion process to be used for the first user and the first application;
  convert, using the first conversion process, the first plurality of character keycodes to the second plurality;
  provide, to the first application, the second plurality of keycodes as the credentials to be used for authenticating the first user at the first application; and
  associate the first conversion process with the first user and the first application to enable use of the first conversion process to generate the second plurality of character keycodes for future authentication requests from the first user for the first application.

15. The system of claim 10, wherein the at least one computer-readable medium is further encoded with additional instructions which, when executed by the at least one processor, further cause the first computing system to:
  authenticate the first user for a resource access application; and
  based on authenticating the first user for the resource access application, receive data representing the first conversion process.

16. The system of claim 10, wherein data representing the first conversion process is received by the first computing system from the client device operated by the first user.

17. The computing system of claim 10, wherein converting using the first conversion process comprises using additional data with the first plurality of character keycodes.

18. At least one non-transitory computer-readable medium encoded with instructions which, when executed by at least one processor of a computing system, cause the computing system to:
  receive a first plurality of character keycodes corresponding to characters input via a client device to authenticate a first user to a first application;
  determine, based at least in part on the first user operating the client device, a first conversion process applicable to the first user;
  convert, using the first conversion process, the first plurality of character keycodes into a second plurality of character keycodes different than the first plurality;
  provide the second plurality of character keycodes to authenticate the first user to the first application, wherein the first application is configured to authenticate the first user using the second plurality of character keycodes the first plurality, thus prohibiting a second user from using the first plurality of character keycodes to authenticate to the first application absent application of the first conversion process;

receive the first plurality of character keycodes via another client device to authenticate the first user to the first application;
determine that a second user is operating the other client device;
determine, based at least in part on the second user operating the other client device, a second conversion process associated with the second user;
convert, using the second conversion process, the first plurality of character keycodes into a third plurality of character keycodes different than the first plurality;
provide the third plurality of character keycodes to the first application to authenticate the first user to the first application; and
receive, from the first application, an indication that authentication failed.

\* \* \* \* \*